(12) United States Patent
Chkodrov et al.

(10) Patent No.: US 8,176,200 B2
(45) Date of Patent: May 8, 2012

(54) DISTRIBUTED AGGREGATION ON AN OVERLAY NETWORK

(75) Inventors: Gueorgui Chkodrov, Redmond, WA (US); Richard D. Hill, Kirkland, WA (US); Michael J. Marucheck, Bellevue, WA (US); Dave Dopson, Seattle, WA (US); Mansoor Mohsin, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 285 days.

(21) Appl. No.: 12/427,613

(22) Filed: Apr. 21, 2009

(65) Prior Publication Data

US 2010/0268808 A1 Oct. 21, 2010

Related U.S. Application Data

(60) Provisional application No. 61/108,443, filed on Oct. 24, 2008.

(51) Int. Cl.
*G06F 13/00* (2006.01)
(52) U.S. Cl. .................. 709/236; 709/246; 709/251
(58) Field of Classification Search .................. 709/236, 709/246, 251
See application file for complete search history.

(56) References Cited

U.S. PATENT DOCUMENTS

| | | | |
|---|---|---|---|
| 6,226,686 B1 | 5/2001 | Rothschild et al. | |
| 6,826,564 B2 | 11/2004 | Thompson et al. | |
| 2005/0114478 A1 | 5/2005 | Popescu et al. | |
| 2005/0165829 A1* | 7/2005 | Varasano | 707/102 |
| 2005/0259571 A1* | 11/2005 | Battou | 370/217 |
| 2007/0121570 A1* | 5/2007 | Takeda et al. | 370/348 |
| 2007/0143442 A1 | 6/2007 | Zhang et al. | |
| 2008/0201467 A1 | 8/2008 | Delany et al. | |
| 2010/0114994 A1* | 5/2010 | Huang et al. | 707/811 |
| 2011/0093511 A1* | 4/2011 | Tapper et al. | 707/803 |

FOREIGN PATENT DOCUMENTS

WO 2008110460 9/2008

OTHER PUBLICATIONS

Ott, Maximilian, et al., "XML-based Semantic Multicast Routing: An Overlay Network Architecture for Future Information Services", IEEE Communications Society, Globecom, 2004, pp. 1650-1654.
Li, Ji, et al., "Implementing Aggregation and Broadcast over Distrbuted Hash Tables", ACM SIGCOMM Computer Communication Review archive, vol. 35, Issue 1 (Jan. 2005), 12 pages.
Funiak, Stanislav, et al., "Distributed inference with declarative overlay networks", Electrical Engineering and Computer Sciences University of California at Berkeley, Oct. 2008,13 pages.
Cai, Min, et al., "Distributed Aggregation Schemes for Scalable Peer-to-Peer and Grid Computing", IEEE Transactions on Parallel and Distributed Systems (TPDS) Sep. 2006, 30 pages.

* cited by examiner

*Primary Examiner* — Kenneth R Coulter
(74) *Attorney, Agent, or Firm* — Workman Nydegger

(57) ABSTRACT

The present invention extends to methods, systems, and computer program products for distributed aggregation on an overlay network. Embodiments of the invention utilize tiers of nodes that are cascaded in a layered system. Each tier reduces the size of data by orders of magnitude through pre-aggregation. Thus, high volume streams of messages can be reduced to lower volume streams at large scales, such as, for example, the Internet. No central coordination is used; thus there is no central point of failure or bottleneck. When a node fails, other nodes in the same tier as the failing node automatically take over the responsibilities of the failed node.

20 Claims, 20 Drawing Sheets

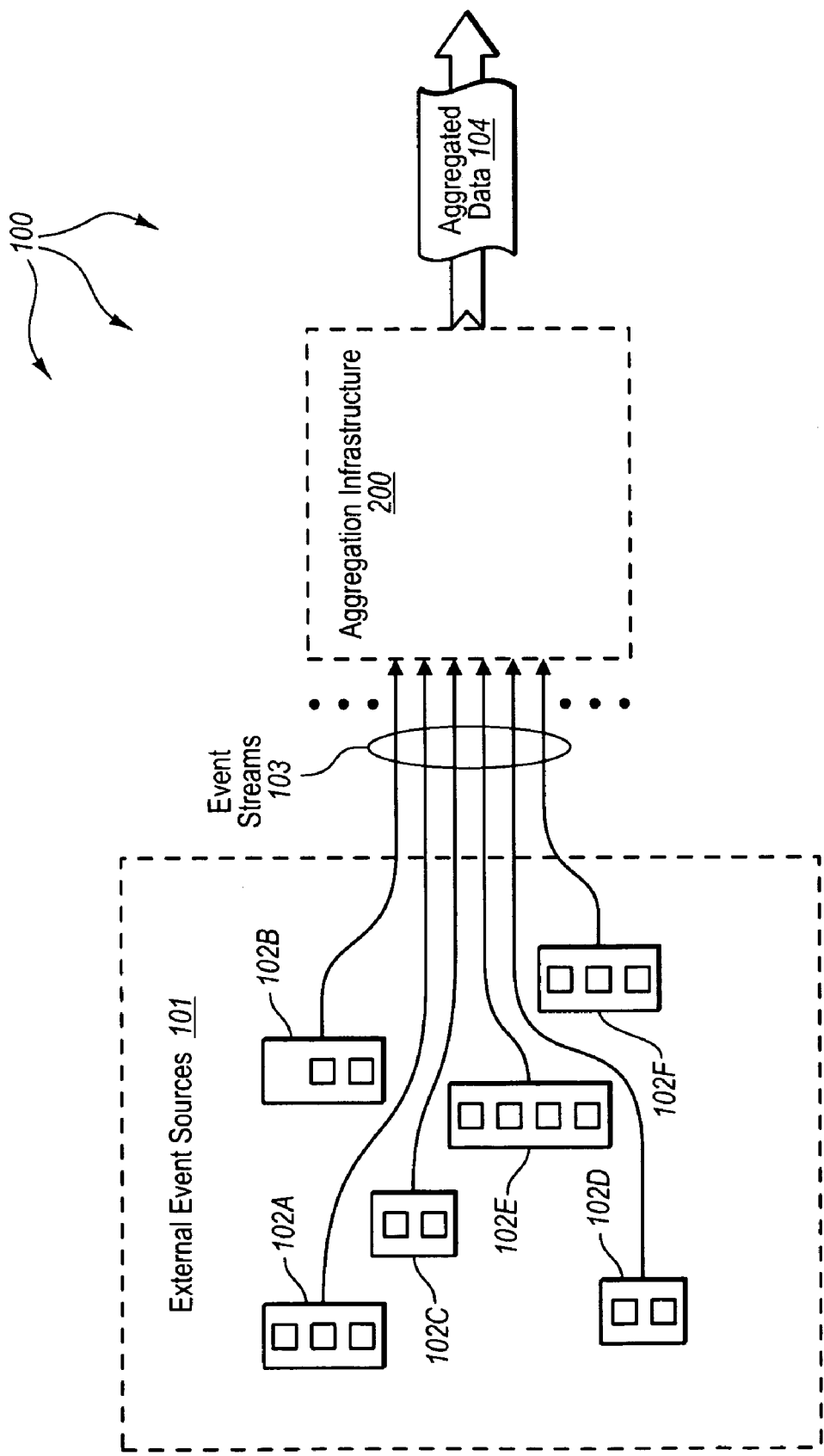

DISTRIBUTED AGGREGATION ON AN OVERLAY NETWORK

CROSS-REFERENCE TO RELATED APPLICATIONS

The present application claims priority to U.S. Provisional Patent Application No. 61/108,443, filed Oct. 24, 2008, and titled "DISTRIBUTED AGGREGATION ON AN OVERLAY NETWORK", which is herein incorporated by reference in its entirety.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing environments.

In some environments, one computer system is configured to monitor and potentially track the occurrence of specified events at one or more other computer systems. For example, a health monitor at one computer system can monitor a number of other computer systems for system health related events. A usage tracking module can monitor the number of bytes transferred to and from other computer systems (e.g., for purposes of billing).

On larger network, such as, for example, the Internet, one computer system can potentially be tasked with monitor events at hundreds or even thousands of other computer systems. Thus, in some monitoring environments there can be thousands of sources producing events/messages. Often, an entity is interested in a global aggregate of all events. For example, an administrator of a distributed service might want to know how many errors occur across a distributed system including of thousands of computer systems, and group them by type of error. Thus, there is the potential to receive large streams of input data originating from many different places.

Often a single monitoring computer system is used to aggregate input data streams from a plurality of other computer systems. However, as the number of input streams increase and/or the volume of data in data input streams increase, the amount of data to that needs to be aggregated eventually overwhelms the resources of the monitoring computer system. That is, the amount of data that can be aggregated is limited by the hardware of the monitoring computer system. Resources of the monitoring computer system can be increased to some extent to compensate. However, at some point it is not economically feasible and/or may become technically impractical to continue to upgrade the monitoring computer systems. For example, there is typically some limit on the amount of system memory that a single computer system can effectively utilize due to limits of its addressing space. Additionally, processor resources are not infinitely scalable at a single computer system.

BRIEF SUMMARY

The present invention extends to methods, systems, and computer program products for distributed aggregation on an overlay network. An overlay network can include a plurality first tier nodes and at least one other node. A first tier node sends pre-aggregated data to the at least one other node in accordance with a corresponding output stream interval. For example, a first tier node receives a plurality of event related messages. Each event related message contains event related data corresponding to one or more of a plurality of different key values (e.g., one or more user names in a key space of user names).

The first tier node pre-aggregates event related data from different messages corresponding to the same key value for each corresponding different key ID within a local dictionary. Pre-aggregation includes aggregating event related data in a first message corresponding to a specified key value with event related data in a second different message also corresponding to the specified key value. The first tier node detects that its corresponding recurring aggregation period has occurred. In response, the first tier node routes a message to the at least one other node. The message contains pre-aggregated event related data for the one or more of the plurality of different key values.

In some embodiments, the at least one other node includes a plurality of second tier nodes. Each second tier is responsible for aggregating data for some subset of the plurality of different key values. Thus, a first tier node can route a message to each second tier nodes that is responsible for a key for which the first tier node has pre-aggregated data. Accordingly, during aggregation a second tier node receives pre-aggregated event related from a plurality of first tier nodes for one or more key values that the second tier node has been has been partitioned to be responsible for within the overlay network.

The second tier node aggregates received pre-aggregated data for each of the one or more key values that the second tier node has been has been partitioned to be responsible for into an aggregate total for each of the one or more key values. The second tier node detects that its corresponding recurring aggregation period (which can be either the same or different that the output timing interval for first tier nodes) has occurred. The second tier node sends the aggregate total for each of the one or more key values to at least one other node. The at least one other node can be a central node or even one or more nodes in a third tier of nodes.

In other embodiments, an overlay network recovers from a node failure within the overlay network. It is detected that a node that is participating in data aggregation within the overlay network has failed. Other nodes on the overlay network continue to participate in data aggregation in their configured capacity notwithstanding that the node has failed. One or more of the other non-failing nodes in the same tier as the failing node each automatically assume responsibility for aggregating at least a portion of the data that the failed node was responsible for prior to failure.

Accordingly, the one or more other non-failing nodes collectively assume responsibility for aggregating data in the capacity of the failed node. Other nodes in the overly are made aware that the one or more other nodes have collective assumed responsibility for aggregating data in the capacity of the failed node. The other nodes reconfigure themselves to interact with the one or more of other non-failing nodes to aggregate data in the overlay network.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 1 illustrates an example computer architecture that facilitates aggregation.

DETAILED DESCRIPTION

Figure 2A:
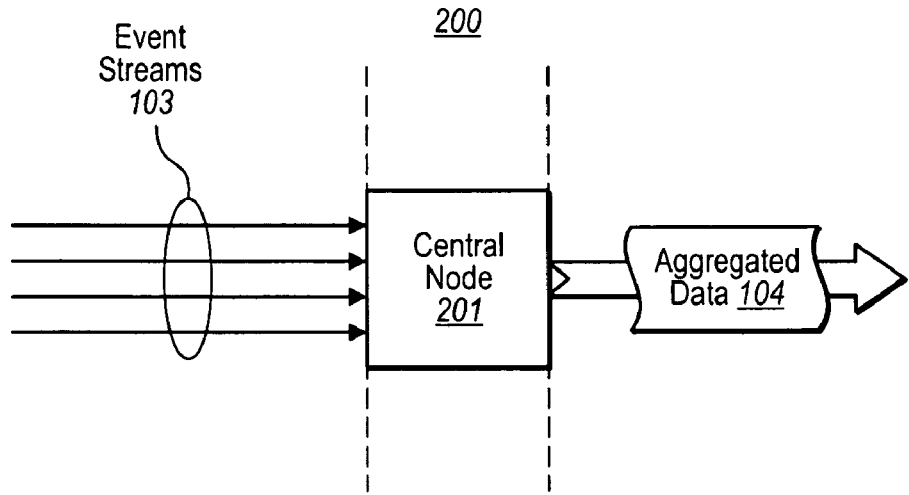
FIG. 2A illustrates an example computer architecture that facilitates aggregation.

The present invention extends to methods, systems, and computer program products for distributed aggregation on an overlay network. An overlay network can include a plurality first tier nodes and at least one other node. A first tier node sends pre-aggregated data to the at least one other node in accordance with a corresponding output stream interval. For example, a first tier node receives a plurality of event related messages. Each event related message contains event related data corresponding to one or more of a plurality of different key values (e.g., one or more user names in a key space of user names).

The first tier node pre-aggregates event related data from different messages corresponding to the same key value for each corresponding different key ID within a local dictionary. Pre-aggregation includes aggregating event related data in a first message corresponding to a specified key value with event related data in a second different message also corresponding to the specified key value. The first tier node detects that its corresponding recurring aggregation period has occurred. In response, the first tier node routes a message to the at least one other node. The message contains pre-aggregated event related data for the one or more of the plurality of different key values.

In some embodiments, the at least one other node includes a plurality of second tier nodes. Each second tier is responsible for aggregating data for some subset of the plurality of different key values. Thus, a first tier node can route a message to each second tier nodes that is responsible for a key for which the first tier node has pre-aggregated data. Accordingly, during aggregation a second tier node receives pre-aggregated event related from a plurality of first tier nodes for one or more key values that the second tier node has been has been partitioned to be responsible for within the overlay network.

The second tier node aggregates received pre-aggregated data for each of the one or more key values that the second tier node has been has been partitioned to be responsible for into an aggregate total for each of the one or more key values. The second tier node detects that its corresponding recurring aggregation period (which can be either the same or different that the output timing interval for first tier nodes) has occurred. The second tier node sends the aggregate total for each of the one or more key values to at least one other node. The at least one other node can be a central node or even one or more nodes in a third tier of nodes.

In other embodiments, an overlay network recovers from a node failure within the overlay network. It is detected that a node that is participating in data aggregation within the overlay network has failed. Other nodes on the overlay network continue to participate in data aggregation in their configured capacity notwithstanding that the node has failed. One or more of the other non-failing nodes in the same tier as the failing node each automatically assume responsibility for aggregating at least a portion of the data that the failed node was responsible for prior to failure.

Accordingly, the one or more other non-failing nodes collectively assume responsibility for aggregating data in the capacity of the failed node. Other nodes in the overly are made aware that the one or more other nodes have collective assumed responsibility for aggregating data in the capacity of the failed node. The other nodes reconfigure themselves to interact with the one or more of other non-failing nodes to aggregate data in the overlay network.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

Within this description and following claims, a "physical network" is defined as one or more data links that enable the transport of electronic data between computer systems and/or modules and/or other electronic devices.

Within this description and in the following claims, an "overlay network" is defined as a computer network that is built on top of another network (e.g., a physical network or another overlay network). Nodes on an overlay network can be viewed as being connected by virtual or logical links, each of which corresponds to a path, perhaps through many physical networks and/or data links, in an underlying network. For example, many peer-to-peer networks are overlay networks because they run on top of the Internet. Overlay networks can be constructed in order to permit routing messages to destinations not specified by an IP address. For example, distributed hash tables can be used to route messages to a node having specific logical address, whose IP address is not known in advance. Overly networks can be of various configurations, including rings as described in greater detail below.

When information is transferred or provided over a network or another communications connection (either hardwired, wireless, or a combination of hardwired or wireless) to a computer, the computer properly views the connection as a transmission medium. Transmission media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to physical storage media (or vice versa). For example, computer-executable instructions or data structures received over a network or data link can be buffered in RAM within a network interface module (e.g., a "NIC"), and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

In some embodiments, hardware modules, such as, for example, special purpose integrated circuits or Gate-arrays are optimized to implement the principles of the present invention.

With this description and following claims, "aggregation" is defined as combining the information in a plurality of data input streams to produce a data output stream that collectively represents the information from the plurality of data input streams. In some embodiments, a larger plurality of data input streams (e.g., tens, hundreds, thousands, or even millions of data input streams) is aggregated into a smaller plurality or a single data output stream. In other embodiments, higher volume data streams, such as, for example, providing hundreds or thousands of megabits of data per second, are integrated into lower volume data streams. Accordingly, embodiments of the invention also include aggregating data from higher numbers of data streams where each data stream is a higher volume data stream into fewer and/or lower volume data output streams.

FIG. 1 illustrates an example computer architecture 100 that facilitates data aggregation. Referring to FIG. 1, computer architecture 100 includes external event sources 101 and aggregation infrastructure 200. Event generation 101 is configured to generate and send events related to the functionality of the computer systems within event generation infrastructure 101.

As depicted, event generation infrastructure 101 includes computer system 102A through 102F. Although six computer systems are expressly depicted in event generation infrastructure 101, event generation infrastructure 101 can include virtually any number of computer systems, such as, for example, tens, hundreds, or thousands of computer systems. Each of computer systems in event generation infrastructure 101, including computer systems 102A through 102F, can send an event stream to aggregation infrastructure 200.

Thus, each computer system in event generation infrastructure 101 can include a module that monitors operations and sends events related to operations to aggregation infrastructure 200. For example, event generation infrastructure 101 can include a plurality of electronic mail servers that provide electronic mail services to users. Each server can include a module that tracks electronic mail usage, for example, tracking one or more of total usage, per user usage, per corporation usage, etc. From time to time or at specified intervals, each module can send an event stream representing mail usage to aggregation infrastructure 200. Accordingly, event streams 103 collectively represent the event streams sent from modules in event generation infrastructure 101 to aggregation infrastructure 200. Event streams can be sent using connectionless protocols (e.g., Internet Protocol ("IP") or User Datagram Protocol "UDP") to avoid overhead (e.g., state maintenance) on underlying communication media.

Aggregation infrastructure 200 is configured to receive event streams and aggregate the data contained in the event streams. Thus, aggregation infrastructure 200 can include a plurality of computer system that interoperate, potentially in a distributed manner, to aggregate data from event streams. For example, aggregation infrastructure 200 can aggregate event streams 103 into aggregated data 104.

Event generation infrastructure 101 and aggregation infrastructure 200 are connected to one another over (or are part of) a network, such as, for example, a Local Area Network ("LAN"), a Wide Area Network ("WAN"), and even the Internet. Computer system within event generation infrastructure 101 and aggregation infrastructure 200 are also connected to one another over (or are part of) a network, such as, for example, a Local Area Network ("LAN"), a Wide Area Network ("WAN"), and even the Internet. Accordingly, computer systems within event generation infrastructure 101 and aggregation infrastructure 200, as well as any other connected computer systems and their components, can create message related data and exchange message related data (e.g., Internet Protocol ("IP") datagrams and other higher layer protocols that utilize IP datagrams, such as, Transmission Control Protocol ("TCP"), User Datagram Protocol ("UDP"), Hypertext Transfer Protocol ("HTTP"), Simple Mail Transfer Protocol ("SMTP"), etc.) over the network.

Single Tier

Within this description and in the following the claims, the following variables will be used:

E: Total input volume of input streams into an aggregation infrastructure (e.g., event streams 103). E has units of events/second. In some embodiments, input streams include each event in a separate message, effectively resulting in each event equaling one message.

N: Total number of input nodes in an aggregation infrastructure. An input node is a node that receives at least a portion of an input stream.

M: Total number of nodes in an aggregation infrastructure. M includes the total number of input nodes N, the central node, as well as any nodes an intermediate tiers between the input nodes and the central node.

T: A recurring aggregation period. A recurring aggregation period represents an amount of time for which a node performs data aggregation operations. When the aggregation period is over, the node sends the results of any aggregation operations to a designated next computing system. T is recurring resulting in data being set from a node at a specified frequent of 1/T. During an aggregation period, a node (e.g., an input node) can pre-aggregate portions of data, such as, for example, from a received portion of an input stream (e.g., at a first tier node). During an aggregation period, a node (e.g., a central node) can also aggregate final results. T can have units of seconds or portions thereof. Although nodes in an aggregation infrastructure can potentially have a different T value, embodiments described hereinafter use a common T value for nodes to reduce the complexity of describing the invention. However, it would be obvious to one skilled in the art, after reading this description and the following claims, that embodiments of the invention include different T values at different nodes within an aggregation infrastructure.

B: Fixed bandwidth for a node or nodes within an aggregation infrastructure. B has units of messages/second. Although nodes in an aggregation infrastructure can potentially have a different B value, depending, for example, on internal hardware components, underlying communication medium, etc., embodiments described hereinafter use a common B value for nodes to reduce the complexity of describing the invention. However, it would be obvious to one skilled in the art, after reading this description and the following claims, that embodiments of the invention include different B values at different nodes with in an aggregation infrastructure.

FIG. 2A illustrates a further example computer architecture that facilitates aggregation. As depicted in FIG. 2A, aggregation infrastructure 200 includes central node 201. Event streams 103 are received at central node 201. Central node 201 then aggregates event streams 103, such as, for example, adding up total electronic mail usage from a plurality of electronic mail servers, into aggregated data 104. Central node 201 can then sends aggregated data 104 to other systems, such as, for example, a billing system, for processing.

In the architecture of FIG. 2A, when total input volume E of event streams 103 exceeds the bandwidth B of central node 201 (E>B), the ability of central node 201 to accurately aggregate events streams 103 can degrade. That is, if the total input volume E exceeds the bandwidth B, there is an increased chance that events can be lost and thus not processed. For example, if central node 201 is operating at bandwidth capacity at a time when additional events are received, central node 201 (or the underlying communication medium) can reject the events causing the rejected events to essentially be lost.

When this occurs, input nodes can be added to aggregation infrastructure 200 to increase input processing capacity. Event streams received at aggregation infrastructure 200 are generally evenly distributed to the input nodes instead of to central node 201. Thus, when B and E are reasonably approximated, the number of input nodes N can be calculated. B at each input node is consumed from input to the input node and output from the input node accordingly to the following equation:

$$B=(E/N)+(1/T)$$

E/N represents the portion of input streams input to each input node. 1/T represents that at for each recurring aggregation period T an input node sends an output message to the central node. Solving for N:

$$N=E/(B-(1/T))$$

Since B is the primary component of bandwidth consumption (unless T is very small), the number of nodes can be approximated from the equation:

$$N=E/B$$

Thus, a single tier arrangement can generally be modeled in accordance with the equations:

$$M=(E/B)+1; \text{ and}$$

$$T=M/B$$

wherein E and B are inputs and M and T are outputs.

Thus, if E=1,200 events/second and B=500 messages/second, at least three additional nodes are needed to be added to aggregation infrastructure 200 to handle the input volume (N=1200/500=2.4, rounding to the next whole number, 3). Thus, four machines can handle 1200 events/second. That is, M=3+1, three input nodes and central node 201.

Figure 2B:
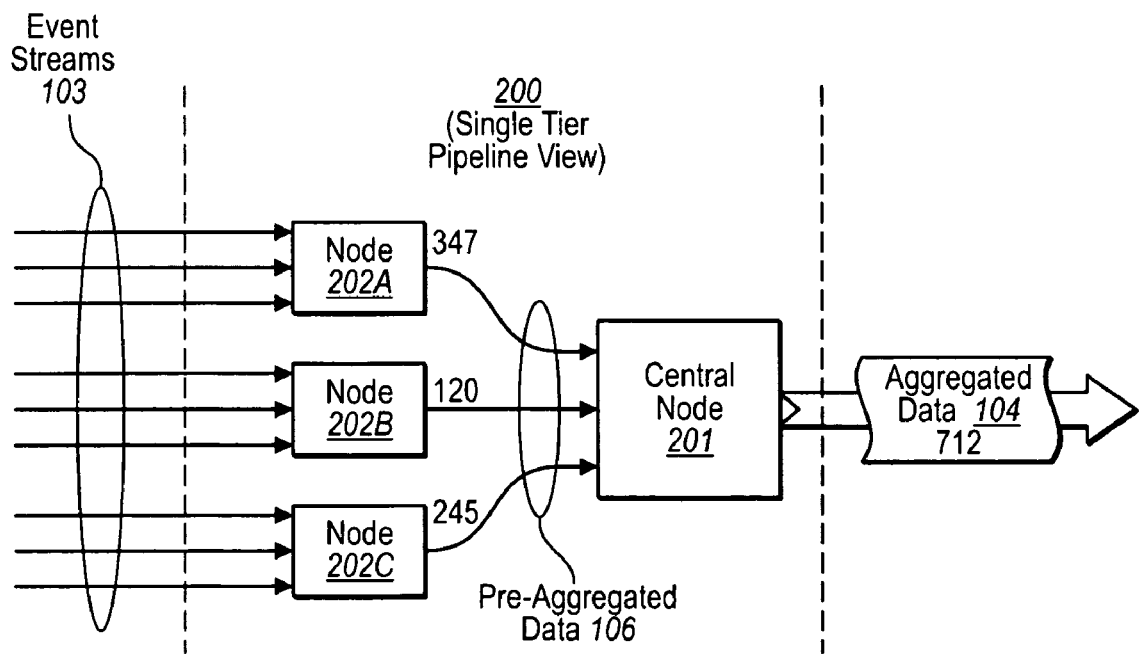
FIG. 2B illustrates an example computer architecture that facilitates distributed aggregation on an overlay.
Figure 2C:
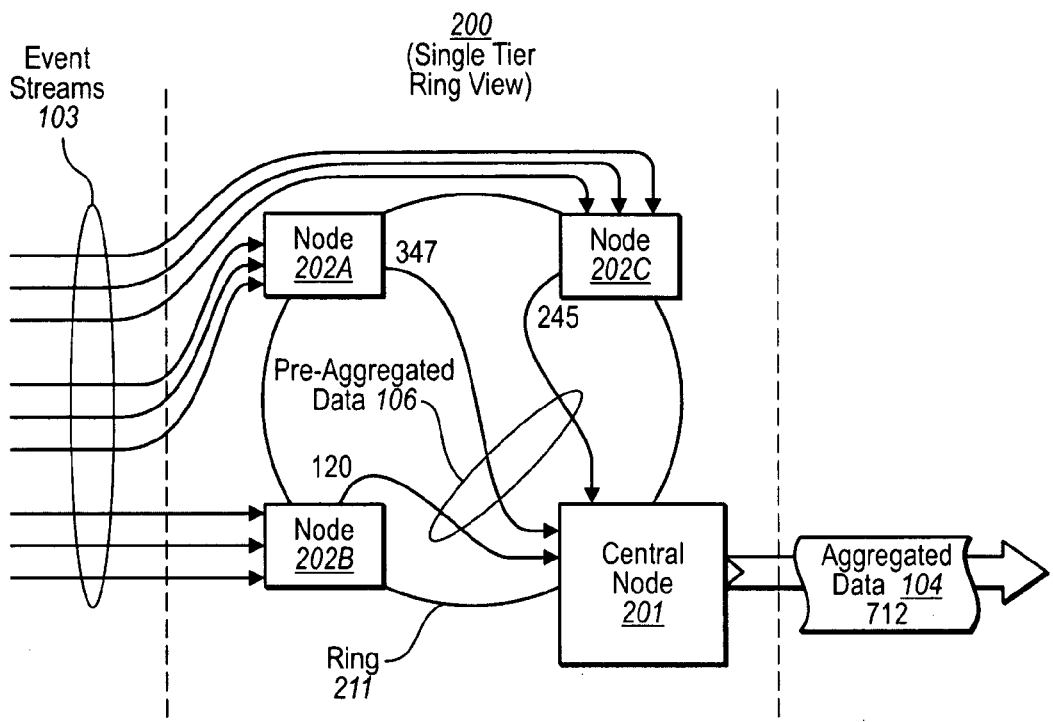
FIG. 2C illustrates an example computer architecture that facilitates distributed aggregation on an overlay.

FIG. 2B illustrates an example computer architecture that facilitates distributed aggregation on an overlay. The aggregation in FIGS. 2B and 2C is similar to the SQL query: select(sum(X)). FIG. 2B depicts a pipeline view of aggregation infrastructure 200 that includes central node 201 as well as input nodes 202A, 202B, and 202C (e.g., a first tier of nodes). Event streams 103 are received at aggregation infrastructure 200. Aggregation infrastructure 200 then distributes out a portion of event streams 103 to each input node 202A, 202B, and 202C. In accordance with a recurring time period T, input nodes 202A, 202B, and 202C pre-aggregate data from portions of event streams 103 that they receive and send pre-aggregated data 106 to central node 201. In accordance with the recurring time period T, central node 201 receives pre-aggregated data 106 and aggregates pre-aggregated data 106 into aggregated data 104. Central node 201 then sends aggregated data 104 to other systems for processing.

Similarly, FIG. 2C illustrates an example computer architecture that facilitates distributed aggregation on an overlay. FIG. 2C depicts a ring view of aggregation infrastructure 200 (from FIG. 2B) that includes central node 201 as well as nodes 202A, 202B, and 202C (a first tier of nodes) on ring 211. Event streams 103 are received at aggregation infrastructure 200. Aggregation infrastructure 200 then distributes out a portion of event streams 103 to each input node 202A, 202B, and 202. In accordance with a recurring time period T, input nodes 202A, 202B, and 202C pre-aggregate data from portions of event streams 103 that they receive and send pre-aggregated data 106 to central node 201. In accordance with the recurring time period T, central node 201 receives the pre-aggregated data 106 and aggregates the pre-aggregated data 106 into aggregated data 104. Central node 201 then sends aggregated data 104 to other systems for processing.

Accordingly, as depicted in FIGS. 2B and 2C, larger E values can be processed and the burden on central node 201 reduced through the use of pre-aggregation at nodes 202A, 202B, and 202C. That is, adding nodes 202A, 202B, and 202C to aggregation infrastructure 200 essentially triples the total input volume that is simultaneously processable, from B to 3B. Further, the input volume to central node 201 is reduced from that of E (the input volume of input streams 103) to 3/T (one message per input node for each recurring time period T).

When response time is not a consideration, the number of input nodes can be essentially increased infinitely to handle larger E values. However, adding more input nodes increases minimum response time to avoid overloading central code 201. The response time of aggregation infrastructure 200 is equal to 2T. That is, (a) an input node pre-aggregates event streams 103 for T before sending pre-aggregated data 106 to central node 201 and (b) central node 201 aggregates data for T before outputting aggregated data 104. T (and thus also response time) increases according to the equation:

$$T=((E/B)+1)/B$$

Generally, E/B is large the +1 can be ignored, thus T increases according to the equation:

$$T=E/B^2$$

However, when a specified response time (i.e., how fast aggregation infrastructure 200 aggregates event streams 103 into aggregated data 104) is desired, the number of input nodes (and as a result the processable input volume) can be restricted in a single tier arrangement. In a single tier arrangement, bandwidth consumption at central node 201 is essentially equal to:

$$B_{consumed}=(N/T)+(1/T)$$

That is, central node 201 receives a message from each input node at each recurring time period and also sends an output message at each recurring time period. Thus, as quicker response time is desired, fewer input nodes can cause bandwidth consumption at central node 201 to approach bandwidth B. For example, for B=500 messages/second and T=1 second, central node 201 can communicate with a maximum of 499 input nodes without exceeding B. That is, central node 201 can receive 499 incoming messages and send 1 outgoing message every second. However, for B=500 messages/second T=500 ms, central node 201 can communicate with a maximum of 249 input nodes without exceeding B. That is, central node 201 can receive 249 incoming messages and send one outgoing message every 500 ms.

In a single tier arrangement, N+1 can be reduced to M. Thus, in a single tier arrangement, consumed bandwidth at central node 201 is essentially equal to:

$$B_{consumed}=M/T$$

Thus, the smallest T for a given number of nodes can be calculated as;

$$T_{small}=M/B$$

For example, if B=500 messages/second in FIGS. 2B and 2C, $T_{small}$=4/500 or 8 ms. Thus, from the prior example, for the single tier arrangement in FIGS. 2B and 2C, aggregation infrastructure 200 can provide a response time of 2*(8 ms), or 16 ms.

Within a single tier arrangement, the maximum E is bound by desired response time and bandwidth B according to the following equation (when Response Time=2T):

$$E_{max}=(\text{Response Time}/2)*B^2$$

Thus, the frequency with which input nodes send pre-aggregated data to a central node can limit the overall input volume that a single tier arrangement, such as, for example, depicted in FIGS. 2B and 2C, can simultaneously process. When E exceeds $E_{max}$ and thus response time for a single tier system can no longer be satisfied, multi-tier aggregation can be used. Multi-tier aggregation includes two or more tiers of nodes used to pre-aggregated data before the data reaches central node 201.

Multi Tier

Within this description and in the following the claims, the following variables will be used:

L: The number of layers or tiers in an aggregation infrastructure.

C: Compression factor. That is, the number of nodes in a given tier that speak to one machine in the next tier. Compression can potentially vary between tiers. For example, six machines in tier one communicating with one machine in tier 2 and four machines in tier 2 can communicating with a central node. However, embodiments described hereinafter use a common C value between layers, such as, for example, between tier 1 and tier 2 and between tier 2 and a central node. However, it would be obvious to one skilled in the art, after reading this description and the following claims, that embodiments of the invention can include different C values per tier with in an aggregation infrastructure.

In a multi-tier arrangement, Response Time can be calculated from the following equation:

Response Time=$(L+1)T$

That is the response time is equal to the time out interval times the number of tiers plus the central node. For example, for a two tier arrangement, Response Time=3T.

Figure 2D:
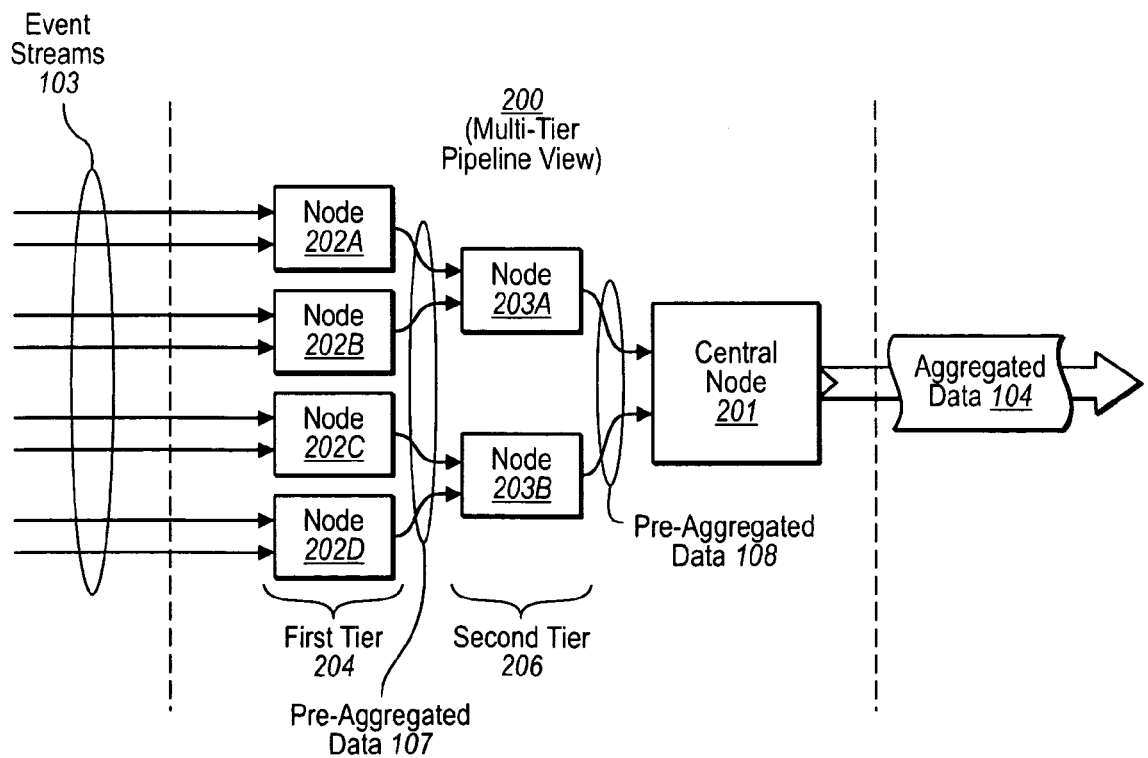
FIG. 2D illustrates an example computer architecture that facilitates multi-tier distributed aggregation on an overlay.

FIG. 2D illustrates an example computer architecture that facilitates multi-tier distributed aggregation on an overlay. FIG. 2D depicts a pipeline view of aggregation infrastructure 200 that includes central node 201, second tier 206, and first tier 204. Second tier 206 includes nodes 203A and 203B. First tier 204 includes input nodes 202A, 202B, 202C, and 202D.

Figure 2E:
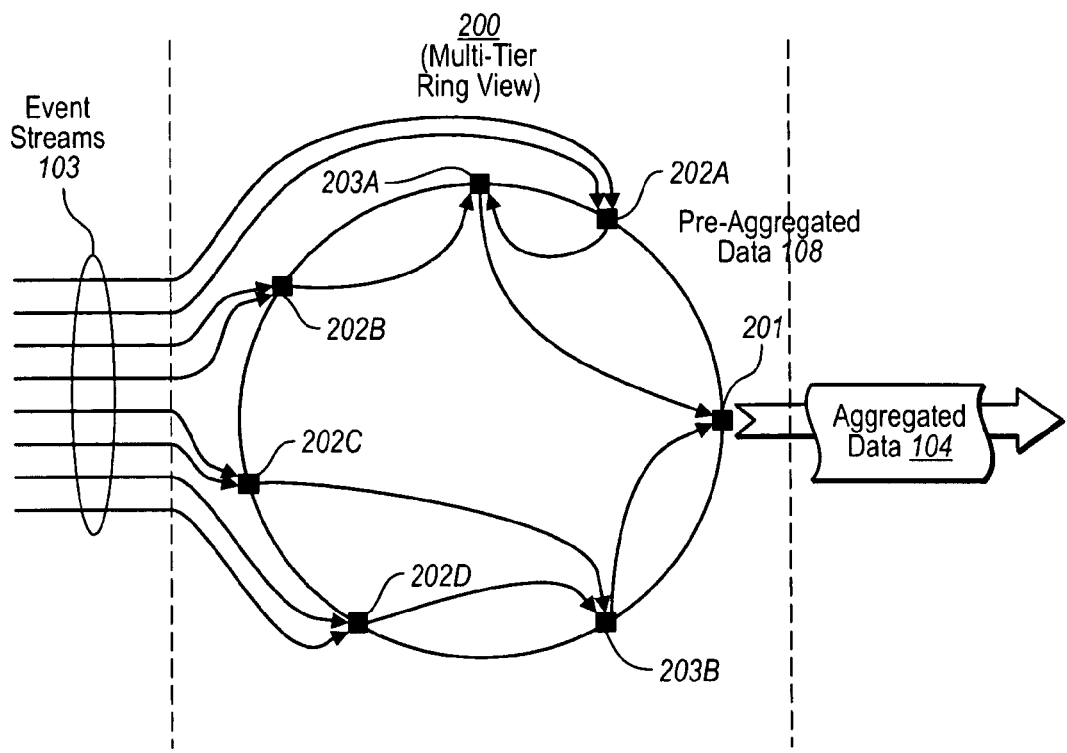
FIG. 2E illustrates an example computer architecture that facilitates multi-tier distributed aggregation on an overlay.

Although not expressly depicted in FIG. 2D, each event within an event stream can include a key value (e.g., a user name, an account number, a machine number, etc). To distribute (or partition) events in an event stream, a key value for an event is hashed into a hash value. The event is then routed to the node that is responsible for the hash value. Thus, upon reaching aggregation infrastructure 200, events in an event stream can be partitioned and sent to different nodes within aggregation infrastructure 200. Thus, the aggregation in FIGS. 2D and 2E is similar to the SQL query: select k, sum(x) group by k. For example, event streams 103 are received at aggregation infrastructure 200. Aggregation infrastructure 200 then distributes out a portion of event streams 103 to each input node 202A, 202B, 202C, and 202D based on key values.

In accordance with a recurring time period T, input nodes 202A, 202B, and 202C, 202D pre-aggregate data from portions of event streams 103 that they receive and send pre-aggregated data 107 to nodes 203A and 203B. Nodes 203A and 203B receive pre-aggregated data 107. In accordance with the recurring time period T, nodes 203A and 203B pre-aggregated data in pre-aggregated data 107 and send pre-aggregated data 108 to central node 201. In accordance with the recurring time period T, central node 201 receives pre-aggregated data 108 and aggregates pre-aggregated data 108 into aggregated data 104. Central node 201 then sends aggregated data 104 to other systems for processing.

FIG. 2E illustrates an example computer architecture that facilitates multi-tier distributed aggregation on an overlay. FIG. 2E depicts a ring view of aggregation infrastructure 200 that includes central node 201, nodes 203A and 203B (representing second tier 206), and input nodes 202A, 202B, 202C, and 202D (representing first tier 204) on ring 211. The usage of hash values described for FIG. 2D is also applicable to FIG. 2E. Thus, event streams 103 are received at aggregation infrastructure 200. Aggregation infrastructure 200 then distributes out a portion of event streams 103 to each input node 202A, 202B, 202C, and 202D.

In accordance with a recurring time period T, input nodes 202A, 202B, and 202C, 202D pre-aggregate data from portions of event streams 103 that they receive and send pre-aggregated data 107 to nodes 203A and 203B. Nodes 203A and 203B receive pre-aggregated data 107. In accordance with the recurring time period T, nodes 203A and 203B pre-aggregated data in pre-aggregated data 107 and send pre-aggregated data 108 to central node 201. In accordance with the recurring time period T, central node 201 receives pre-aggregated data 108 and aggregates pre-aggregated data 108 into aggregated data 104. Central node 201 then sends aggregated data 104 to other systems for processing.

Within a multi-tier arrangement, for a given T, optimal bandwidth limited compression factor C can be calculated. For example, at a node in second tier 206, bandwidth usage is calculated from the following equation:

$B=(C/T)+(1/T)$

That is, the node receives messages from C number of nodes in first tier 204 every recurring aggregation period and sends an output message to central node 201 every output period. Solving for C, as limited by bandwidth:

$C_{Bandwidth\ Limited}=BT-1$

Within a reasonable approximation of E, B, and Response Time, C and L can also be derived. The number of messages input to central node 201 is C/T. The number of messages input to the tier before central node 201 (e.g., second tier 206) is $C^2/T$. As such the number of messages input to input nodes (e.g., tier 204) can be derived as:

$E=(C^{L+1})/T$

Estimating the total number of machines
For zero tiers there is only one machine (the central node)
For one tier, there are C+1 machine
For two tiers, there are $C^2+C+1$ machines
For L tiers, there are $C^L+C^{L-1}+\ldots+C+1$ machines
this is a geometric progression having the sum:

$M=(1-C^{L+1})/(1-C)$

Accordingly, a multi-tier arrangement can be modeled in accordance with the following equations:

$T$=Response Time/$(L+1)$;

$C=BT-1$;

$M=(1-C^{L+1})/(1-C)$; and $E=(C^{L+1})/T$ wherein Response Time, L, and B are inputs and E, M, T, and C are outputs.

Aggregation with Dedicated Buckets

In some embodiments, aggregation is grouped by key, in either a single tier or multi-tier arrangement.

Within this description and in the following the claims, the following variables will be used:

$N_1$: Number of machines in first tier, input nodes that group and aggregate.
$N_2$: Number of nodes in second tier, owners of global aggregation for subset of key values.
K: Unique values of the key.

Thus, bandwidth consumption for an individual input node (first tier):

$B=E/N_1+K/T$

In a system with essentially equal distribution, an individual second tier node will own $K/N_2$ buckets. Then the equation for bandwidth consumption for a second tier node:

$B=N_1/T+K/N_2T$

Accordingly, a two tier arrangement with dedicated buckets can be modeled in accordance with the following equations:

$N_1=E/(B-(K/T))$; and $N_2=K/[T(B-(N_1/T))]$ wherein E, K, B, and T are inputs and $M=N_{1[[1]]}+N_{2[[2]]}$ are outputs.

Figure 2F:
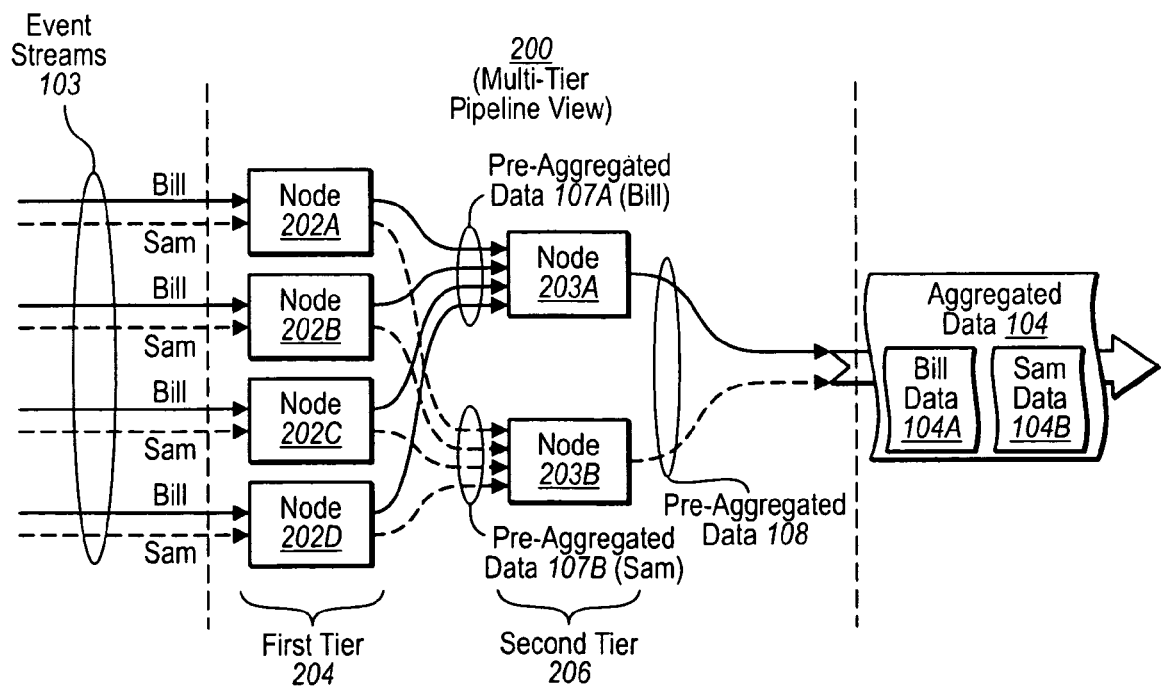
FIG. 2F illustrates an example computer architecture that facilitates multi-tier distributed aggregation on an overlay with dedicated buckets.

FIG. 2F illustrates an example computer architecture that facilitates multi-tier distributed aggregation on an overlay with dedicated buckets. Similar to FIG. 2D, FIG. 2F depicts a pipeline view of aggregation infrastructure 200 that includes central node 201, second tier 206, and first tier 204. Second tier 206 includes nodes 203A and 203B. First tier 204 includes input nodes 202A, 202B, 202C, and 202D. Further, events within event streams are expressly divided between different key values, including "Bill" and "Sam".

Nodes 203A and 203B are configured as dedicated buckets for different portions of keyed data. For example, configured can be based on the first letter of a key. Thus, node 203A can responsible for key values starting with letters A through M and node 203B can responsible for key values starting with letters N-Z. Alternately, nodes 203A and 203B can each be responsible for a range of hash values. Thus, node 203A can be responsible for a range of hash values, including a hash value resulting from hashing the key value "Bill". Further, node 203B can be responsible for a range of hash values, including a hash value resulting form hashing the key value "Sam".

Event streams 103 are received at aggregation infrastructure 200. As described, event streams 103 include a plurality of events keyed to Bill (and potentially other names starting with letters A-M) and a plurality of events keyed to Sam (and potentially other names starting with letters N-Z). An event stream of event streams 103 is received at each input node 202A, 202B, 202C, and 202D. As such, each of input nodes 202A, 202B, 202C, and 202D receives some events for Bill (and potentially other names starting with letters A-M) and some events for Sam (and potentially other names starting with letters N-Z).

In accordance with a recurring time period T, input nodes 202A, 202B, and 202C, 202D pre-aggregate data for events with the same key values from any event streams that they receive and send pre-aggregated data 107A and 107B to nodes 203A and 203B respectively. Nodes 202A, 202B, and 202C, 202D send pre-aggregated data 107A (for Bill and other names starting with letters A-M)) to node 203A. Similarly, nodes 202A, 202B, and 202C, 202D send pre-aggregated data 107 B (for Sam and other names starting with letters N-Z) to node 203A.

Alternately nodes 202A, 202B, 202C, and 202D can hash key values after pre-aggregation and send pre-aggregated data to second tier nodes for hash values for which they have pre-aggregated data. In either event, nodes 203A and 203B receive pre-aggregated data 107A and 107B respectively. In accordance with the recurring time period T, nodes 203A and 203B pre-aggregated data in pre-aggregated data 107A and 107B respectively and send pre-aggregated data 108 to central node 201. In accordance with the recurring time period T, central node 201 receives pre-aggregated data 108 and aggregates pre-aggregated data 108 into aggregated data 104, including Bill events 104A and Sam events 104B. Central node 201 then sends aggregated data 104 to other systems for processing.

Figure 2G:
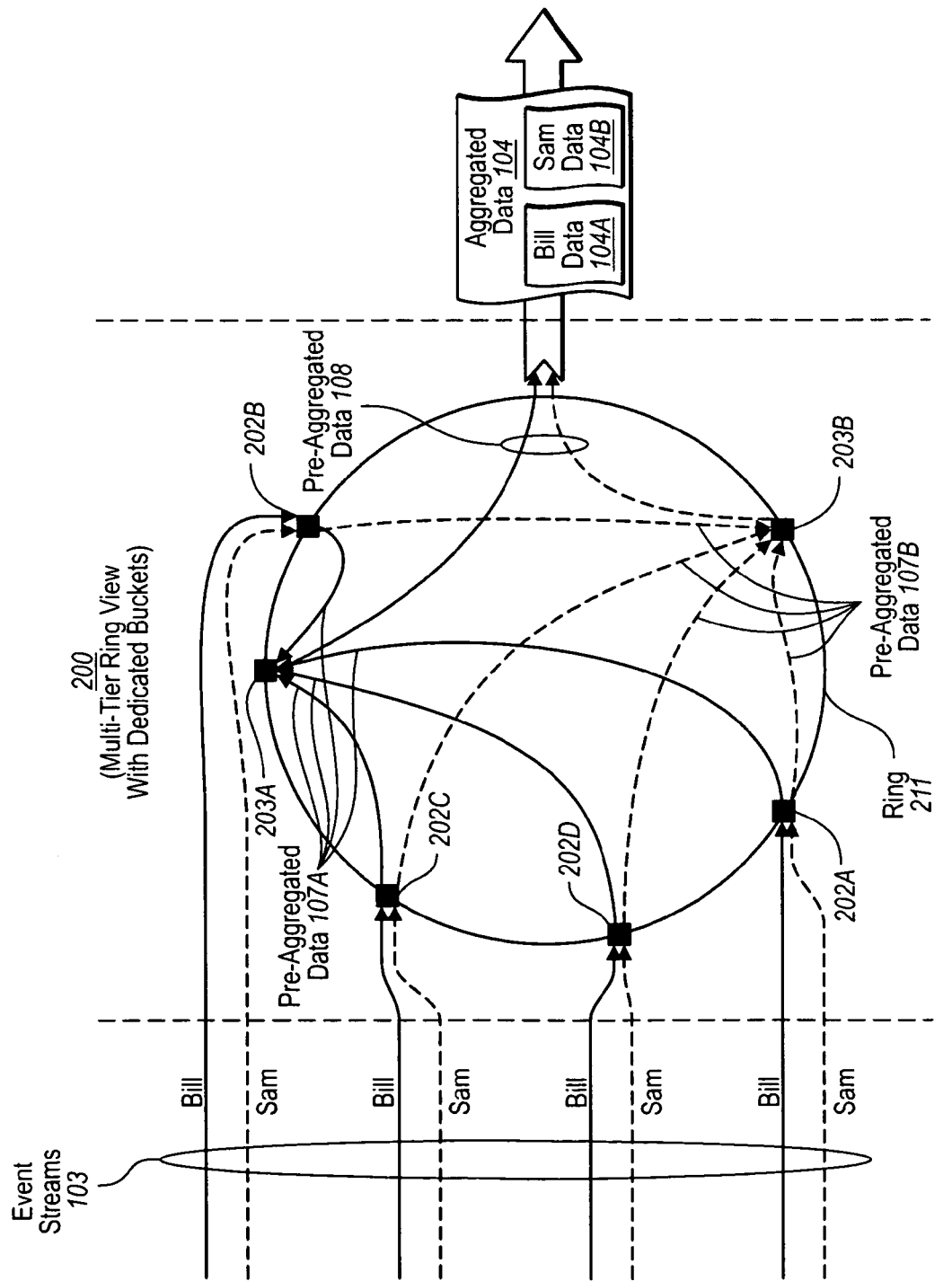
FIG. 2G illustrates an example computer architecture that facilitates multi-tier distributed aggregation on an overlay with dedicated buckets.

FIG. 2G illustrates an example computer architecture that facilitates multi-tier distributed aggregation on an overlay with dedicated buckets. Similar to FIG. 2E, FIG. 2G depicts a ring view of aggregation infrastructure 200 that includes central node 201 central node 201, nodes 203A and 203B (representing second tier 206), and input nodes 202A, 202B, 202C, and 202D (representing first tier 204) on ring 211. The usage of hash values described for FIG. 2F is also applicable to FIG. 2G. Thus, event Nodes 203A and 203B are configured as dedicated buckets for different portions of keyed data. For example, configured can be based on the first letter of a key. Thus, node 203A can be configured for keys starting with letters A through M and node 203B can be configured for keys starting with letters N-Z.

Event streams 103 are received at aggregation infrastructure 200. Event streams 103 includes a plurality of event streams keyed to Bill (and other names starting with letters A-M) and a plurality of event streams keyed to Sam (and other names starting with letters N-Z). Aggregation infrastructure 200 distributes out a portion of event streams 103 to each input node 202A, 202B, 202C, and 202D. As such, each of input nodes 202A, 202B, 202C, and 202D receives a stream of events for Bill (and other names starting with letters A-M) and a stream of events for Sam and other names starting with letters N-Z).

In accordance with a recurring time period T, input nodes 202A, 202B, and 202C, 202D pre-aggregate data from portions of event streams 103 that they receive and send pre-aggregated data 107 to nodes 203A and 203B. Nodes 202A, 202B, and 202C, 202D send pre-aggregated data 107A (for Bill and other names starting with letters A-M)) to node 203A. Similarly, nodes 202A, 202B, and 202C, 202D send pre-aggregated data 107 B (for Sam and other names starting with letters N-Z) to node 203A.

Nodes 203A and 203B receive pre-aggregated data 107A and 107B respectively. In accordance with the recurring time period T, nodes 203A and 203B pre-aggregated data in pre-aggregated data 107A and 107 B respectively and send pre-aggregated data 108 to central node 201. In accordance with the recurring time period T, central node 201 receives pre-aggregated data 108 and aggregates pre-aggregated data 108 into aggregated data 104, including Bill events 104A and Sam events 104B. Central node 201 then sends aggregated data 104 to other systems for processing.

Figure 3:
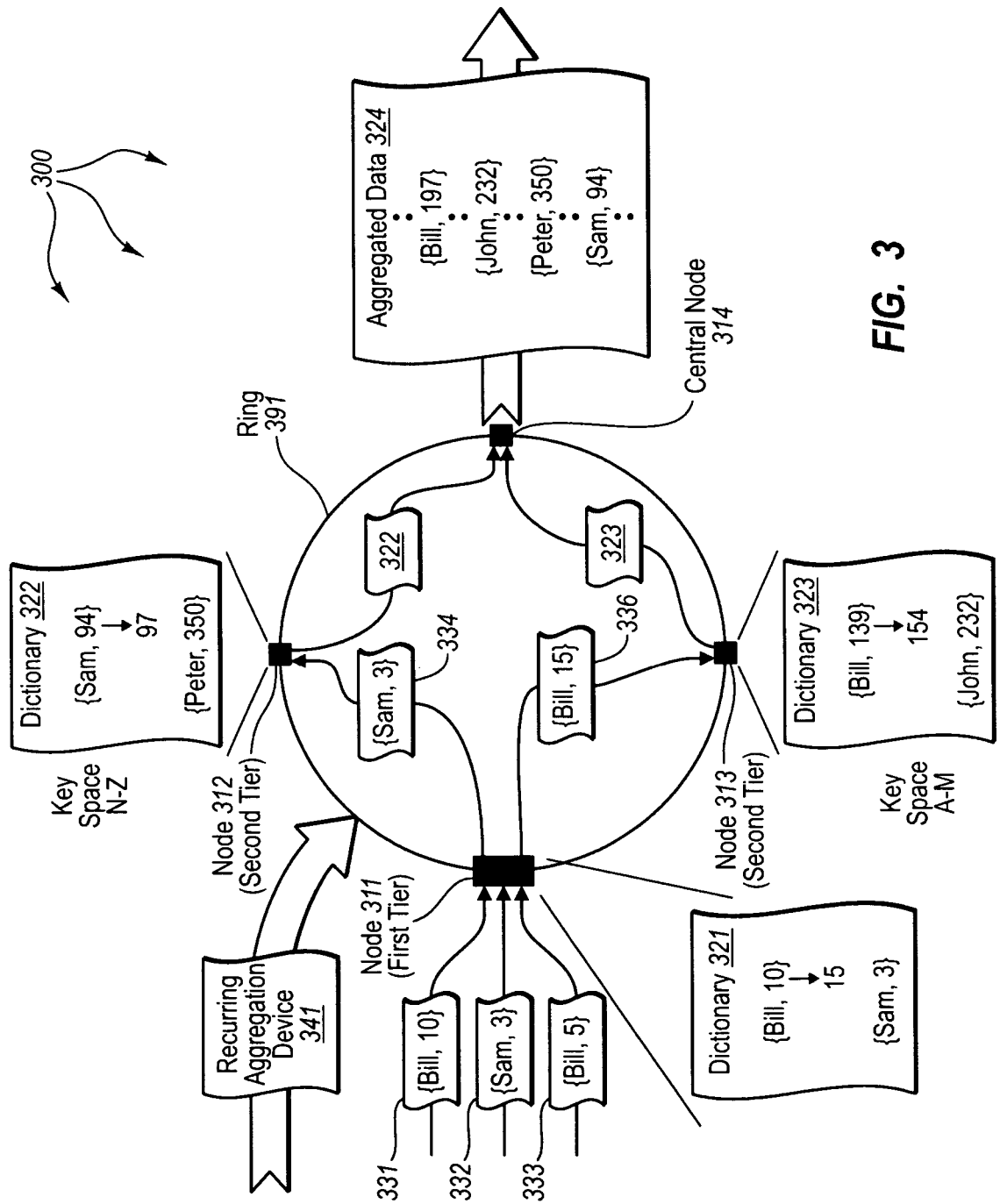
FIG. 3 illustrates another example computer architecture that facilitates multi-tier distributed aggregation on an overlay with dedicated buckets.

FIG. 3 illustrates another example computer architecture that facilitates multi-tier distributed aggregation on an overlay with dedicated buckets. FIG. 3, depicts nodes 311 (a first tier node), nodes 312 and 323 (second tier nodes), and central node 314 on ring 391. Node 312 is responsible for key values starting with letters N-Z and node 312 is responsible for key values starting with letters A-M. Each node maintains a dictionary used to accumulate usage of a particular resource (e.g., within event generation infrastructure 101) by key value.

For example, as node 311 receives messages 331, 332, 333, indicating usage events for specific key values, node 311 can add received usage to a running total for the specific Key values within dictionary 321. For example, upon receiving message 331, node 311 can create a dictionary entry for Bill with a value of 5. Then upon receiving message 332, node 311 can create a dictionary entry for Sam with a value of 3. Then upon receiving message 333, node 311 can increment the dictionary entry for Bill to a value of 15.

When recurring aggregation period 341 occurs (i.e., T), node 311 can send portions of dictionary 321 (i.e., pre-aggregated data) to node 311 and 312. Portions of dictionary 321 having Key values starting with letters A-M can be sent to node 313. For example, message 336 includes pre-aggregated data for Bill. Portions of dictionary 321 having Key values starting with letters N-Z can be sent to node 312. For example, message 334 includes pre-aggregated data for Sam. After the dictionary data is sent, all entries in Dictionary 321 can be removed to begin pre-aggregating data for the next aggregation period.

Existing values in dictionary 323, including {Bill, 139} and {John, 232}, can be the result of receiving pre-aggregated data from other first tier nodes. Data in message 336 can be used to maintain dictionary 323. For example, node 313 can increment the value for Bill from 139 to 154. Similarly, existing values in dictionary 322, including {Sam, 94} and {Peter, 350}, can be the result of receiving pre-aggregated data from other first tier nodes. Data in message 334 can be used to maintain dictionary 322. For example, node 312 can increment the value for Sam from 97 to 99.

When recurring aggregation period 341 occurs, any second tier nodes can send their entire dictionary to central node 314. For example, node 312 can send dictionary 322 top central node 314 and node 313 can send dictionary data 323 to central node 314. After the dictionaries are sent, all entries in dictionaries 322 and 322 can be removed to begin pre-aggregating data for the next aggregation period.

Upon receiving dictionaries 322 and 323, central node 314 can aggregate the data in dictionaries 322 and 323 into aggregated data 324. For example, central node 314 can create entries {Bill, 91}, {John, 323}, {Peter, 350}, and {Sam, 94}, in aggregated data 324. When recurring aggregation period 341 occurs, central node 314 can send aggregated data 324 to a further computer system, such as, for example, to a billing system. The billing system can in turn send invoices to Bill, John, Peter, and Sam for the usage of resources in event generation infrastructure 101.

Alternately, it may be that nodes 312 and 313 as well as other second tier nodes are each responsible for a range of the ID space of ring 391. Node 111 (as well as other first tier nodes) can hash key values, such as, for example, "Bill" and "Sam" into hash values. The hash values are representative of IDs in the ID space of ring 391. The infrastructure of ring 391 then handles routing pre-aggregated data for a key value to the second tier node that is responsible for representative ID in the ID space ring 391. A more detailed description of ring infrastructure and ring ID space is described below.

Figure 4:
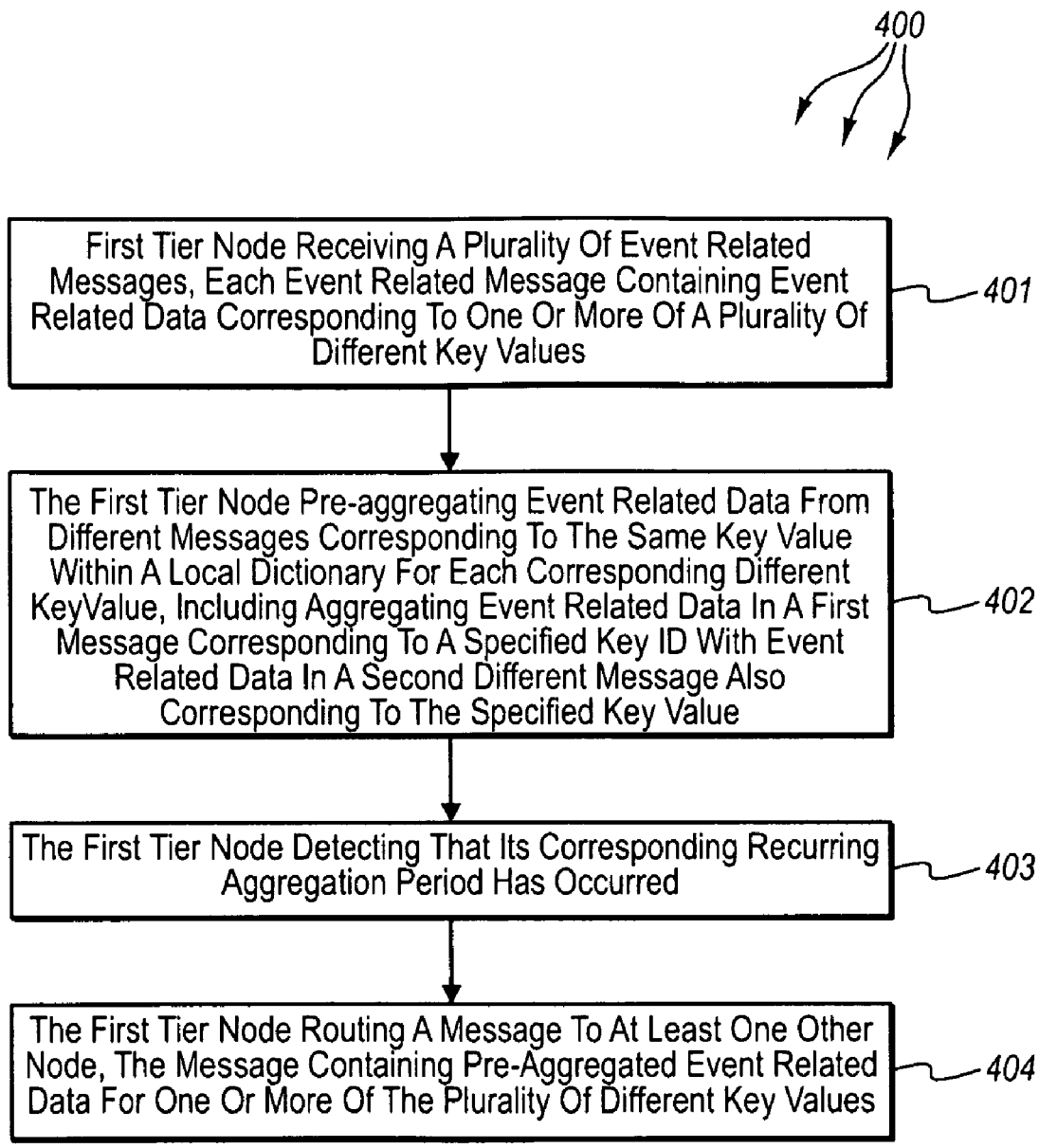
FIG. 4 illustrates an example flow chart of a method for aggregating event related data.

FIG. 4 illustrates an example flow chart of a method for aggregating event related data. Method 400 will be described with respect to the components and data in FIG. 3.

Method 400 includes an act of a first tier node receiving a plurality of event related messages, each event related message containing event related data corresponding to one or more of a plurality of different key values (act 401). For example, node 311 can receive messages 331, 332, and 333. Method 300 includes an act of the first tier node pre-aggregating event related data from different messages corresponding to the same key value for each corresponding different key value within a local dictionary, including aggregating event related data in a first message corresponding to a specified key value with event related data in a second different message also corresponding to the specified key value (act 402). For example, node 311 can pre-aggregate data from messages 331, 332, and 333 into dictionary 321. Pre-aggregation at node 311 can include aggregating event related data for Bill in messages 331 and 333 into dictionary 321.

Method 400 includes an act of the first tier node detecting that its corresponding recurring aggregation period has occurred (act 403). For example, node 311 can detect that recurring aggregation period 341 has occurred. Method 400 includes an act of the first tier node routing a message to the at least one other node, the message containing pre-aggregated event related data for the one or more of the plurality of different key values (act 404). For example, node 311 can send message 334 to node 312 and send message 336 to node 313. In single tier environments, node 311 can send a message directly to control node 314.

Figure 5:
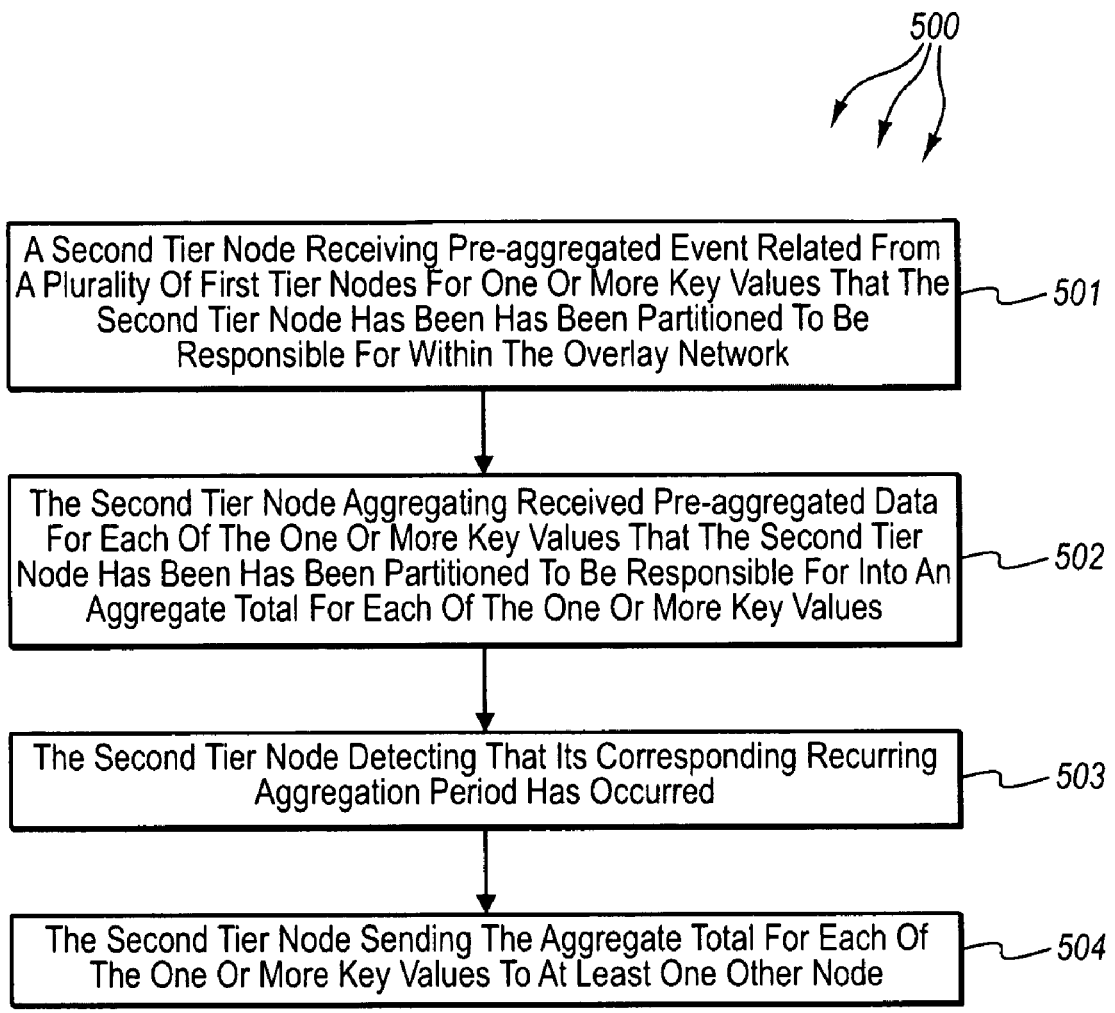
FIG. 5 illustrates an example flow chart of a method for aggregating event related data.

FIG. 5 illustrates an example flow chart of a method 500 for aggregating event related data. Method 500 will be described with respect to the components and data in FIG. 3.

Method 500 includes an act of a second tier node receiving pre-aggregated event related from a plurality of first tier nodes for one or more key values that the second tier node has been has been partitioned to be responsible for within the overlay network (act 501). For example, node 312 can receive message 334 from node 311 as well as pre-aggregated data for key values starting with A-M from other first tier nodes on ring 391. Method 500 includes an act of the second tier node aggregating received pre-aggregated data for each of the one or more key values that the second tier node has been has been partitioned to be responsible for into an aggregate total for each of the one or more key value. For example, node 312 can aggregate message 334, along with pre-aggregated data for key values starting with A-M received from other first tier nodes, into dictionary 322.

Method 500 includes an act of the second tier node detecting that its corresponding recurring aggregation period has occurred (act 503). For example, node 312 can detect that recurring aggregation period 341 has occurred. Method 500 includes an act of the second tier node sending the aggregate total for each of the one or more key values to at least one other node (act 504). For example, node 312 can send dictionary 322 to control node 314. Alternately, node 312 can send a portion of dictionary 322 to a third tier node.

Ring Maintenance

Nodes on a ring can federated together in a variety of different ways. Accordingly, a ring consists of a federated set of nodes that cooperate among themselves to form a dynamic and scalable network in which information can be systematically and efficiently disseminated and located. Nodes are organized to participate in a federation as a sorted list using a binary relation that is reflexive, anti-symmetric, transitive, total, and defined over the domain of node identities. Both ends of the sorted list are joined, thereby forming a ring. Thus, each node in the list can view itself as being at the middle of the sorted list (as a result of using modulo arithmetic). Further, the list is doubly linked so that any node can traverse the list in either direction.

Each federating node can be assigned an ID (e.g., by a random number generator with duplicate detection) from a fixed set of IDs between 0 and some fixed upper bound. Thus, adding 1 to an ID of the fixed upper bound results in an ID of zero (i.e., moving from the end of the linked list back to the beginning of the linked list). In addition, a 1:1 mapping function from the value domain of the node identities to the nodes themselves is defined.

Figure 6:
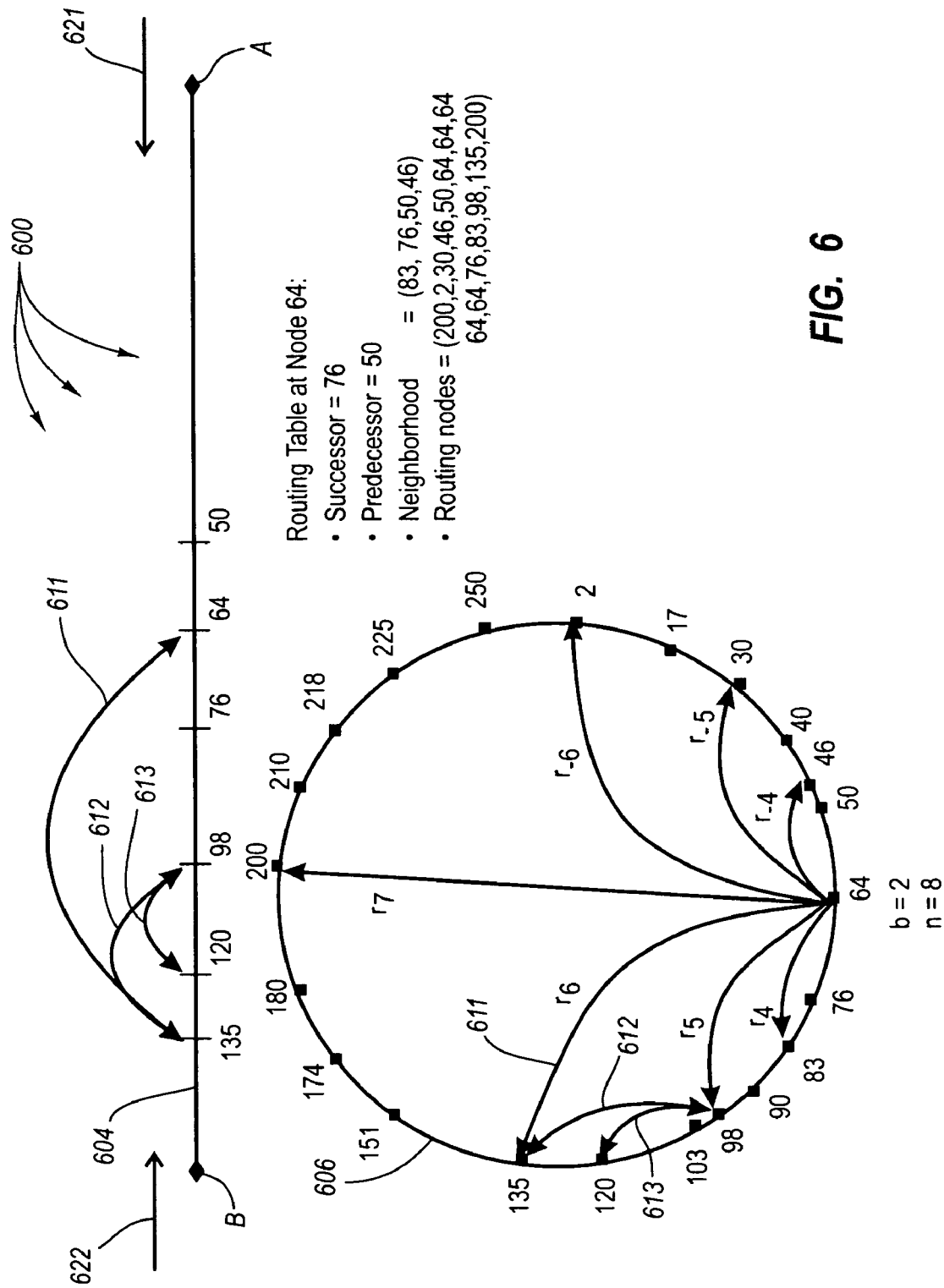
FIG. 6 illustrates an example binary relationship between nodes in a federation infrastructure in the form of a sorted list and corresponding ring.

FIG. 6 depicts an example linked list 604 and corresponding ring 606. Given such a ring, the following functions can be defined:

RouteNumerically(V, Msg): Given a value V from the value domain of node identities and a message "Msg," deliver the message to node X whose identity can be mapped to V using the mapping function.

Neighborhood(X, S): Neighborhood is the set of nodes on the either side of node X with cardinality equal to S.

When every node in the federation has global knowledge of the ring, RouteNumerically(V, Msg) is implemented by directly sending Msg to the node X, whose identity is obtained by applying the mapping function to V. Alternately, when nodes have limited knowledge of other nodes (e.g., only of immediately adjacent nodes), RouteNumerically(V, Msg) is implemented by forwarding the message to consecutive nodes along the ring until it reaches the destination node X.

Alternately (and advantageously), nodes can store enough knowledge about the ring to perform a distributed binary search (without having to have global knowledge or implement routing between immediately adjacent nodes). The amount of ring knowledge is configurable such that maintaining the ring knowledge has a sufficiently small impact on each node but allows increased routing performance from the reduction in the number of routing hops.

As previously described, IDs can be assigned using the "<" (less than) relation defined over a sufficiently large, bounded set of natural numbers, meaning its range is over a finite set of numbers between 0 and some fixed value, inclusive. Thus, every node participating in the federation is assigned a natural number that lies between 0 and some appropriately-chosen upper bound, inclusive. The range does not have to be tight and there can be gaps between numbers assigned to nodes. The number assigned to a node serves as its identity in the ring. The mapping function accounts for gaps in the number space by mapping a number falling in between two node identities to the node whose identity is numerically closest to the number.

This approach has a number of advantages. By assigning each node a uniformly-distributed number, there is an increased likelihood that all segments of the ring are uniformly populated. Further, successor, predecessor, and neighborhood computations can be done efficiently using modulo arithmetic.

In some embodiments, federating nodes are assigned an ID from within an ID space so large that the chances of two nodes being assigned the same ID are highly unlikely (e.g., when random number generation is used). For example, a node can be assigned an ID in the range of 0 to $b^n-1$, where b equals, for example, 8 or 16 and n equals, for example, 128-bit or 160-bit equivalent digits. Accordingly, a node can be assigned an ID, for example, from a range of 0 to $16^{40}-1$ (or approximately 1.461502E48). The range of 0 to $16^{40}-1$ would provide, for example, a sufficient number of IDs to assign every node on the Internet a unique ID.

Thus, each node in a federation can have:
An ID which is a numerical value uniformly distributed in the range of 0 to $b^n-1$; and
A routing table consisting of (all arithmetic is done modulo $b^n$):
Successor node (s);
Predecessor node (p);
Neighborhood nodes $(p_k, \ldots, p_1, p, s, s_1, \ldots, s_j)$ such that $s_j.s.id>(id+u/2)$, $j \geq v/2-1$, and $p_k.p.id<(id-u/2)$, and $k \geq v/2-1$; and
Routing nodes $(r_{-(n-1)}, \ldots, r_{-1}, r_1, \ldots, r_{n-1})$ such that $r_{\pm i}$=RouteNumerically($id \pm b^i$, Msg).

where b is the number base, n is the field size in number of digits, u is the neighborhood range, v is the neighborhood size, and the arithmetic is performed modulo $b^n$. For good routing efficiency and fault tolerance, values for u and v can be u=b and $v \geq \max(\log_2(N), 4)$, where N is the total number of nodes physically participating in the federation. N can be estimated from the number of nodes present on a ring segment whose length is greater than or equal to b, for example, when there is a uniform distribution of IDs. Typical values for b and n are b=8 or 16 and n=128-bit or 160-bit equivalent digits.

Accordingly, routing nodes can form a logarithmic index spanning a ring. Depending on the locations of nodes on a ring, a precise logarithmic index is possible, for example, when there is an existing node at each number in the set of $id \pm b^i$ where i=(1, 2, ... (n-1)). However, it may be that there are not existing nodes at each number in the set. In those cases, a node closest to $id \pm b^i$ can be selected as a routing node. The resulting logarithmic index is not precise and may even lack unique routing nodes for some numbers in the set.

Referring again to FIG. 6, FIG. 6 illustrates an example of a binary relation between nodes in a federation infrastructure in the form of sorted list 604 and corresponding ring 606. The ID space of sorted list 304 is in the range 0 to $2^8-1$ (or 255). That is, b=2 and n=8. Thus, nodes depicted in FIG. 6 are assigned IDs in a range from 0 to 255. Sorted list 604 utilizes a binary relation that is reflexive, anti-symmetric, transitive, total, and defined over the domain of node identities. Both ends of sorted list 304 are joined, thereby forming ring 606. This makes it possible for each node in FIG. 3 to view itself as being at the middle of sorted list 604. The sorted list 304 is doubly linked so that any node can traverse the sorted list 604 in either direction. Arithmetic for traversing sorted list 604 (or ring 606) is performed modulo $2^8$. Thus, 255 (or the end of sorted list 604)+1=0 (or the beginning of sorted list 304).

The routing table indicates that the successor to ID 64 is ID 76 (the ID immediately clockwise from ID 64). The successor can change, for example, when a new node (e.g., with an ID of 71) joins or an existing node (e.g., ID 76) leaves the federation infrastructure. Likewise, the routing table indicates that the predecessor to ID 64 is ID 50 (the ID immediately counters clockwise from ID 64). The predecessor can change, for example, when a new node (e.g., with an ID of 59) joins or an existing node (e.g., ID 50) leaves the federation infrastructure.

The routing table further indicates that a set of neighborhood nodes to ID 64 have IDs 83, 76, 50 and 46. A set of neighbor nodes can be a specified number of nodes (i.e., neighborhood size v) that are within a specified range (i.e., neighbor range u) of ID 64. A variety of different neighborhood sizes and neighbor ranges, such as, for example, V=4 and U=10, can potentially be used to identify the set of neighborhood nodes. A neighborhood set can change, for example, when nodes join or leave the federation infrastructure or when the specified number of nodes or specified range is changed.

The routing table further indicates that ID 64 can route to nodes having IDs 200, 2, 30, 46, 50, 64, 64, 64, 64, 76, 83, 98, 135, and 200. This list is generated by identifying the node closest to each number in the set of $id \pm 2^i$ where i=(1, 2, 3, 4, 5, 6, 7). That is, b=2 and n=8. For example, the node having ID 76 can be identified from calculating the closest node to $64+2^3$, or 72.

A node can route messages (e.g., requests for access to resources) directly to a predecessor node, a successor node, any node in a set of neighborhood nodes, or any routing node. In some embodiments, nodes implement a numeric routing function to route messages. Thus, RouteNumerically(V, Msg) can be implemented at node X to deliver Msg to the node Y in the federation whose ID is numerically closest to V, and return node Y's ID to node X. For example, the node having ID 64 can implement RouteNumerically(243, Msg) to cause a message to be routed to the node having ID 250. However, since ID 250 is not a routing node for ID 64, ID 64 can route the message to ID 2 (the closest routing node to 243). The node having ID 2 can in turn implement RouteNumerically(243, Msg) to cause the message to be routed (directly or through further intermediary nodes) to the node having ID 250. Thus, it may be that a RouteNumerically function is recursively invoked with each invocation routing a message closer to the destination.

Node Monitoring

Figure 7A:
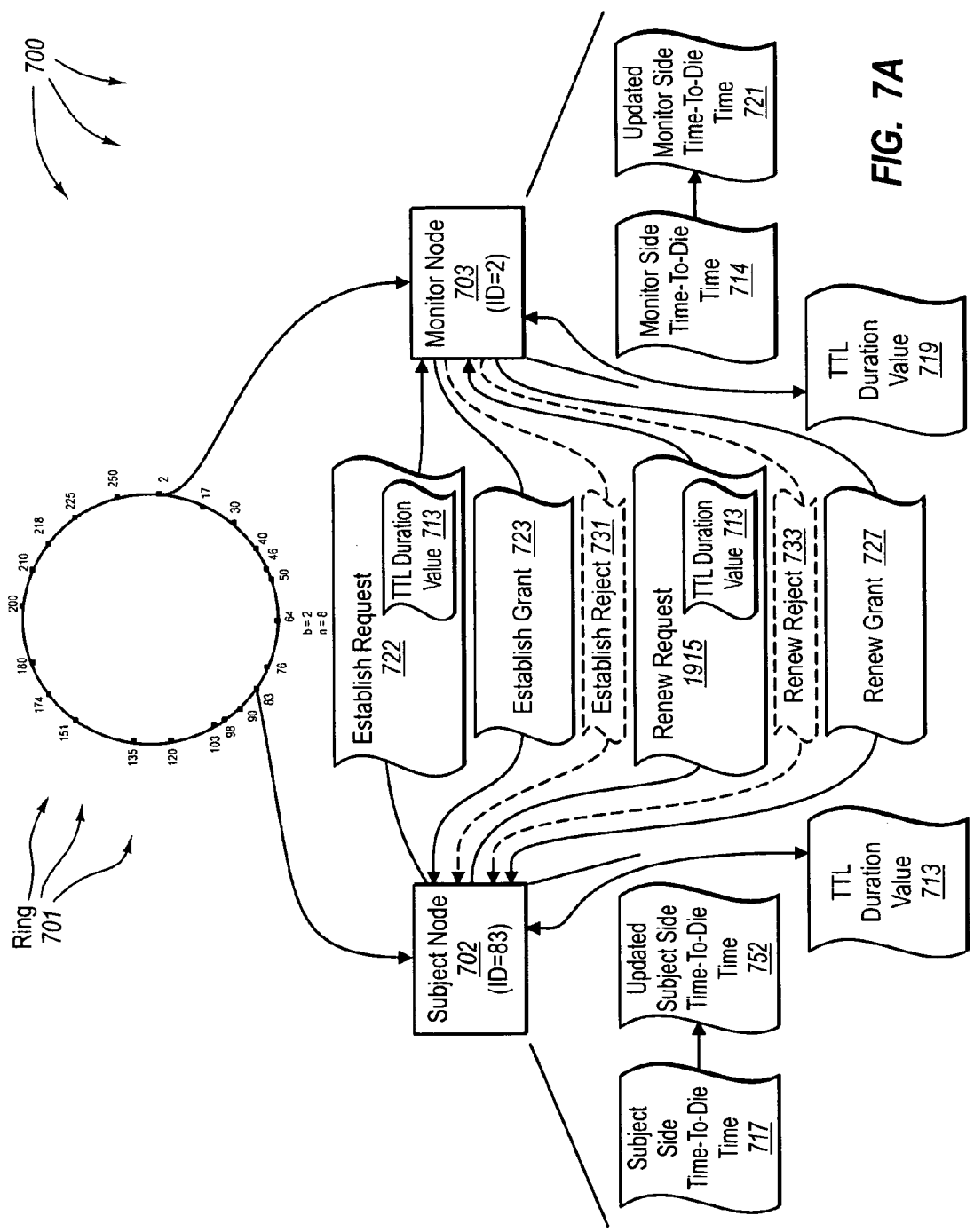
FIG. 7A illustrates an example ring architecture that facilitates one node monitoring another (e.g., subject) node.

FIG. 7A illustrates an example ring architecture 700 that facilitates one node monitoring another node. As depicted, ring architecture includes at least ring 701 (and any number of other higher and/or lower level rings (not shown)). Ring 701 can be configured similar to ring 606 of FIG. 6. However, monitoring can occur on any ring of nodes, including any of the rings in FIGS. 2C, 2E, and 2G. FIG. 7A depicts an expanded view of subject node 702 (having ID=83) and monitor node 703 (having ID=2). In the depicted embodiment, monitor node 703 is to monitor subject node 702. However, any node on ring 701 can be configured to monitor any other node on ring 701.

One way monitoring: In some embodiments, one node performs a method for monitoring another node. A subject node generating a subject side time-to-live duration value for use in monitoring of the subject node. For example, subject node 702 can establish time-to-live (TTL) duration value 713. TTL duration value 713 indicates a duration for which subject node 702 can assume a monitoring relationship with monitor node 703 is active. The subject can send an establish request to the monitor node, the establish request indicative of the subject node requesting that the monitor node monitor the subject node, the establish request including the subject side time-to-live duration value. For example, subject node 702 can send establish request 722, including TTL value duration 713, to monitor node 703.

The subject node establishes an existing subject side time-to-die time based on the subject side time-to-live duration value and the time the establish request was sent, wherein the subject node clock reaching the existing subject side time-to-die time, prior to receiving an establish grant from the monitor node, is an indication of the subject node having to transition to a failure state. For example, subject node 702 can establish subject side time-to-die time 717 based on TTL duration value 713 and the time the establish request 722 was sent to monitor node 703. Subject side time-to-die time 717 can be a time relative to subject node 702. If a clock of subject node 702 reaches subject side time-to-die time 717, prior to receiving an establish grant form monitor node 703, subject node 702 is to transition to a failure state. In some embodiments, when a clock of subject node 702 reaches subject side time-to-die time 717, prior to receiving an establish grant from monitor node 703, a failure state is caused. In other embodiments, other activities occur to transition subject node 702 into a failure state.

The monitor node receives the establish request from the subject node, the establish request indicative of the subject node requesting that the monitor node monitor the subject node, the establish request including at least the subject side time-to-live duration value, the subject side time-to-live duration value used to determine a subject side time-to-die time at the subject node, wherein the subject node clock reaching the subject side time-to-die time, prior to receiving an establish grant from the monitor node, is an indication of the subject node having to transition to a failure state. For example, monitor node 703 can receive establish request 722, including TTL duration value 713, from subject node 702. TTL duration value 713 having been used at subject node 702 to establish subject side time-to-die time 717.

The monitor node derives a monitor side time-to-live duration value from the subject side time-to-live duration value. For example, monitor node 702 can use TTL value duration 713 to derive TTL duration value 77. In some embodiments, monitor node 703 copies TTL duration value 713 to derive TTL duration value 77. In these embodiments, TTL value duration 713 and TTL value duration 77 are equal. In other embodiments, monitor node 703 modifies TTL duration value 713 to derive TTL duration value 77. In these other embodiments TTL duration value 713 and TTL duration value 77 differ. For example, monitor node 703 can increase the value of TTL duration value 713 to derive TTL duration value 77 such that TTL duration value 77 is larger than TTL duration value 713.

The monitor node establishes a monitor side time-to-die time based on the monitor side time-to-live duration value and the time the establish request was received, the monitor node clock reaching the monitor side time-to-die time, prior to receiving a renew request from the subject node, being indicative of a suspected failure of the subject node. For example, monitor node 703 monitor side time-to-die time 714 based on TTL duration value 77 and the time establish request 722 was received. Monitor side time-to-die time 714 can be a time relative to monitor node 703. If a clock of monitor node 703 reaches monitor side time-to-die time 714, prior to receiving a renew request from subject node 702, monitor node 703 suspects subject node 702 of failure.

The monitor node sending an establish grant to the subject node to indicate to the subject node that the monitor node has agreed to monitor the subject node. For example, monitor node 703 can send establish grant 723 to subject node 702. The subject node receives the establish grant from the monitor node, the establish grant indicative of the monitor node monitoring the subject node. For example, subject node 702 can receive establish grant 723 from monitor node 703. Generally, establish grant 723 indicates that monitor node 703 has agreed to monitor subject node 702. In some embodiments, the establish grant message can include the monitor side TTL duration value. For example, it may be establish grant 723 includes TTL duration value 719.

Alternately, a monitor node can send an establish reject to a subject node to indicate to the subject node that the monitor node has not agreed to monitor the subject node. For example, in response to receiving establish request 722, monitor node 703 can alternately (as indicated by the dashed line) send establish reject 731 to subject node 702. A subject node can receive an establish reject sent from a monitor node. For example, subject node 702 can receive establish reject 731 from monitor mode 703. Establish reject 731 generally indicates to subject node 702 that monitor node 703 has not agreed to monitor subject node 702.

From time to time (and intermingled between the performance of other operations within ring architecture 700), a subject node can renew an established monitoring agreement with a monitor node. Generally, the subject node leaves the existing agreement in force (the current subject-side-time to die time) until a new grant is received. However, the subject node can generate a new TTL duration value and derive what an updated time-to-die time would be. The subject node then sends the new TTL duration value to the monitor node. The monitor node receives the new TTL duration value. When appropriate the monitor node grants the renew request and sends a renew grant back to the subject. The subject node receives the renew grant. In response to receiving the renew grant the subject implements the renewed agreement using the updated time-to-die time as the new current time-to-die time.

Renewal of Monitoring Agreement: In some embodiments, a node renews an established monitoring agreement with another node. Renewing an established monitoring agreement can include the subject node sending a renew request to the monitor node prior to the subject node clock reaching the subject side time-to-die time. For example, subject node 702 can send renew request 715, including TTL duration value 713, to monitor node 703 prior to a clock of subject node 702 reaching subject side time-to-die time 717. In some embodiments, renew request 715 does not include a subject side TTL duration value. In these embodiments, continued use of TTL duration value 713 can be inferred. In other embodiments, TTL duration value 713 is expressly included in renew request 715. In yet other embodiments, a different subject side TTL duration value is included in renew request 715. A new subject side TTL duration value can be generated and used by subject node 702 in response to configuration changes of subject node 702 and/or to configuration changes else where in ring 701 (e.g., changed network conditions).

Node 702 can also calculate what an updated subject side time-to-die time is to be if a corresponding renew grant responsive to renew request 715 is received. The calculation can be based at least on the time renew request 715 was sent and on the subject side TTL duration value related to or associated with renew request 715.

The monitor node receives a renew request from the subject node subsequent to sending the establish grant message and prior to the monitor node clock reaching the monitor side time-to-die time, the renew request indicating that the subject node has not failed. For example, monitor node 703 can receive renew request 715 subsequent to sending establish grant 723 and prior to a clock of monitor node 703 reaching monitor side time-to-die time 714. Reception of renew request 715 can indicate to monitor node 703 that subject node 702 has not failed.

The monitor node grants the renew request to the subject node. For example, monitor node 703 can grant renew request 715.

The monitor node establishes an updated monitor side time-to-die time in response to and based at least on the time the renew request was received, the monitor node clock reaching the updated monitor side time-to-die time, prior to receiving another renew request from the subject node, being indicative of a suspected failure of the subject node. For example, monitor node 703 can establish updated monitor side time-to-die time 721 in response to and based on the time renew request 715 was received and the implied or indicated monitor TTL duration value related to or potentially contained in a renew request 715. Updated monitor side time-to-die time 721 can be a time relative to monitor node 703. Updated monitor side time-to-die time 721 can be subsequent to monitor side time-to-die time 714. However, there is no requirement that monitor side time-to-die time 714 have occurred before establishing updated monitor side time-to-die time 721. Thus, it is also possible that updated monitor side time-to-die time 721 is in fact prior to (or the same as) monitor side time-to-die time 714. If a clock of monitor node 703 reaches updated monitor side time-to-die time 721, prior to receiving another renew request from subject node 702, monitor node 703 suspects subject node 702 of failure.

If no subject side TTL duration value is included in renew request 715 (and thus TTL duration value 713 is inferred) or if renew request expressly includes TTL duration value 713, monitor node 703 can also use TTL duration value 719 to establish updated monitor side time-to-die time 721. On the other hand, if a subject side TTL duration value other than TTL duration value 713 is expressly included in renew request 715, monitor node 703 can use the other expressly included subject side TTL duration value to derive a new monitor side TTL duration value. From the new monitor side TTL duration value, monitor node 703 can then establish updated monitor side time-to-die time 721.

The monitor node sends a renew grant to the subject node to indicate to the subject node that the monitor node has agreed to continue monitoring the subject node. For example, monitor node 703 can send renew grant 727 to subject node 702. The subject node receives the renew grant from the monitor node subsequent to sending the corresponding renew request and prior to the subject node clock reaching the subject side time-to-die time, the renew grant message indicative of the monitor node continuing to monitor the subject node. For example, subject node 702 can receive renew grant 727 from monitor node 703 subsequent to sending renew request 715 and prior to a clock at subject node 702 reaching subject side time-to-die time 717. Generally, renew grant 727 is indicative of monitor node 703 agreeing to continue to monitor subject node 702.

Alternately, a monitor node can send a renew reject to a subject node to indicate to the subject node that the monitor node is no longer agreeing to monitor the subject node. For example, in response to receiving renew request 715, monitor node 703 can alternately (as indicated by the dashed line) send renew reject 733 to subject node 702. A subject node can receive a renew reject sent from a monitor node. For example, subject node 702 can receive renew reject 733 from monitor mode 703. Renew reject 731 generally indicates to subject node 702 that monitor node 703 is no longer agreeing to monitor subject node 702.

The subject node transitions to a previously calculated updated subject side time-to-die time in response to receiving the renew grant, wherein the subject node clock reaching the updated subject side time-to-die time, prior to receiving another renew grant from the monitor node, is an indication of the subject node having to transition to a failure state. For example, subject node 702 can transition to updated subject side time-to-die time 752 when the corresponding renew grant message is received. Updated subject side time-to-die time 752 can have been calculated at around the time renew request 715 was sent to monitor node 703. Updated subject side time-to-die time 752 can have been calculated based on the time corresponding renew request 715 was sent and on the TTL duration related to or associated with renew request 715. Updated subject side time-to-die time 752 can be a time (e.g., subsequent, prior, or equal to subject side time-to-die time 717) relative to subject node 702.

If TTL value 713 is still the appropriate TTL value, subject node 702 can also use TTL duration value 713 to establish updated subject side time-to-die time 752. If another TTL duration value has been generated, subject node 702 can also use the other generated TTL duration value to establish updated subject side time-to-die time 752.

Subsequent, to establishment of a current subject side time-to-die time (either 717 or 752), it may be a clock at subject node 702 reaches the current subject side time-to-die time prior to receiving another renew grant from monitor node 703. This may result from communication errors between subject node 702 and monitor node 703. For example, subject node 702 may send another renew request subsequent receiving renew grant 727 and prior to a clock of subject node 702 reaching updated subject side time-to-die time 752. However, due to communication failures the other renew request does not reach monitor node 703. Alternately, the other renew request may be received at monitor node 703, but the corresponding renew grant from monitor node 703 does not reach subject node 702 due to communication errors. In either event, a clock at subject node 702 may reach a current subject side time-to-die time prior to receiving the corresponding renew grant responsive to the other renew request.

Alternately, subject node 702 can malfunctioning such that subject node 702 is prevented from sending another renew request to monitor node 703 prior to a clock at subject node 702 reaching t updated subject side time-to-die time 752.

However, whether or not a renew request is sent, if a renew grant is not received prior to a clock at subject node 702 reaching a current subject side time-to-die time 752, subject node 702 transitions into a failure state.

Referring back to monitor node 703, it may be that a clock at monitor node 703 reaches a monitor side time-to-die time (either 714 or 721) prior to receiving another renew request from subject node 702 (either due to a malfunction at subject node 702 or to communication errors in ring 701). As a result, monitor node 703 suspects subject node 702 of failure. Monitoring node 703 can transition to a timeout state indicative of detecting a suspected failure at another node.

Figure 7B:
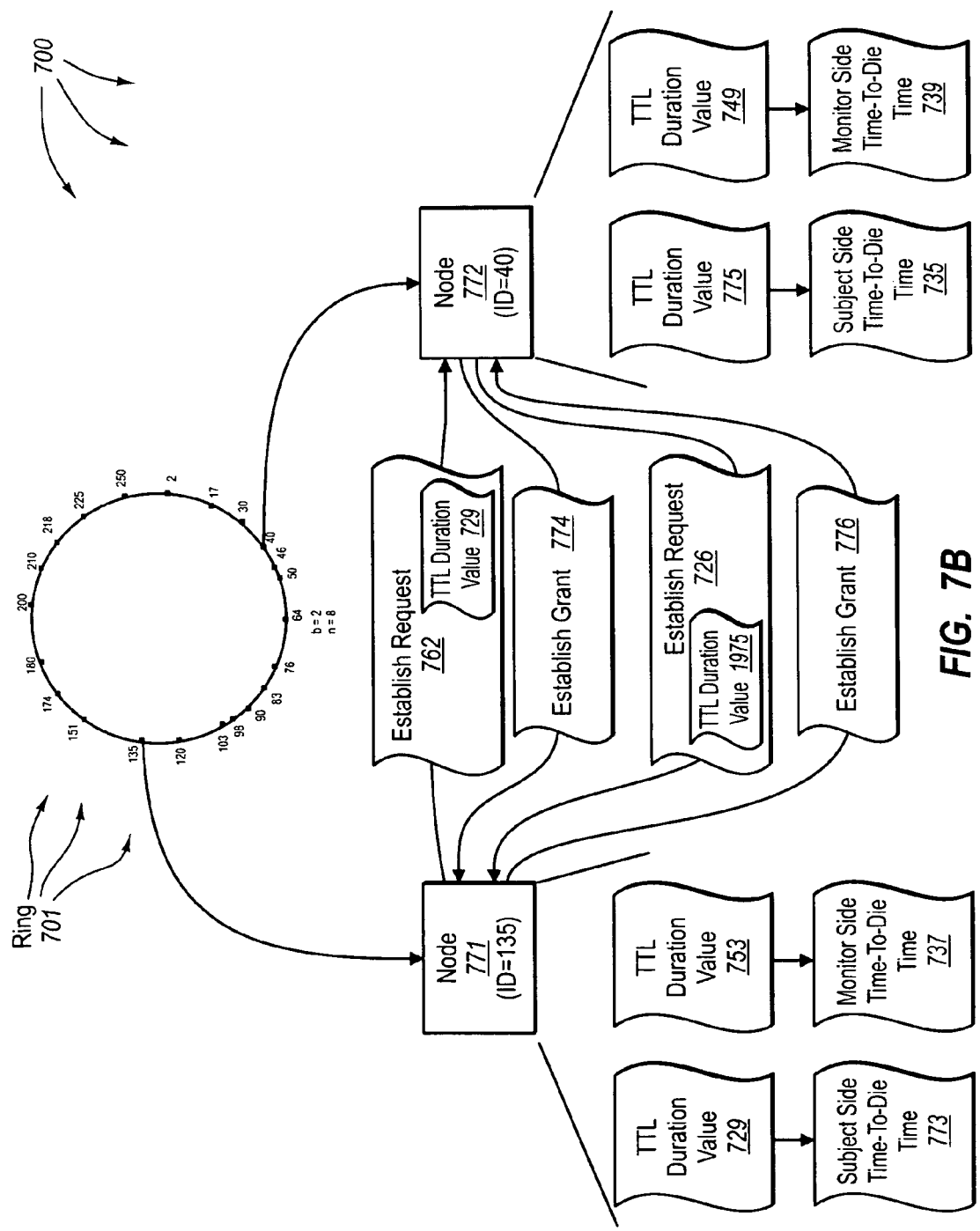
FIG. 7B illustrates an example ring architecture that facilitates two nodes monitoring each other.

Two way monitoring: In other embodiments a pair of nodes can monitor each other. Thus, a first node can monitor a second node and the second node can also monitor the first node. For example, each node can implement both a subject node side and a monitor node side method through communication with the other node. FIG. 7B illustrates an example ring architecture 700 that facilitates two nodes monitoring each other Node 771 can generate TTL duration value 729 for use in monitoring node 771. Node 771 can send establish request 762, including TTL duration value 729, to node 772. Node 771 can also establish subject side time-to-die time 773 based on TTL duration value 729. Node 772 can receive establish request 762, including TTL duration value 729, from node 771. Node 772 can derive TLL duration value 749 from TTL duration value 729. Node 772 can establish monitor side time-to-die time 739 based on TTL duration value 749. Node 772 can send establish grant 774 to node 771. Node 771 can receive establish grant 774 from node 772.

In parallel, node 772 can generate TTL duration value 775 for use in monitoring node 772. Node 772 can send establish request 726, including TTL duration value 775, to node 771. Node 772 can also establish subject side time-to-die time 735 based on TTL duration value 775. Node 771 can receive establish request 726, including TTL duration value 775, from node 772. Node 771 can derive TLL duration value 753 from TTL duration value 733. Node 771 can establish monitor side time-to-die time 737 based on TTL duration value 753. Node 771 can send grant message 776 to node 772. Node 772 can receive grant message 776 from node 771.

Alternately, either of nodes 771 and 772 reject an establish request from the other node. For example, node 771 can reject establish request 762. Likewise, node 772 can reject establish request 726. When either node rejects an establish request, it can send an establish reject (e.g., similar to establish reject 731) to the other node. This indicates to the other node that no monitoring agreement has been established.

Node 771 and node 772 can then exchange renew requests and renew grants (as well as renew rejects similar to renew reject 733) as previously described. Accordingly, each of node 771 and node 772 are both a subject node and a monitor node. Based on the depicted TTL duration values and time-to-die times in FIG. 7B, various events may occur during and/or after the monitor relationships are established.

If a clock at node 771 reaches subject side time-to-die time 773 prior to receiving a renew grant from node 772, node 771 transitions to a failure state. If a clock at node 772 reaches monitor side time-to-die time 739 prior to receiving a renew request from node 771, node 772 suspects node 771 of failure.

If a clock at node 772 reaches subject side time-to-die time 735 prior to receiving a renew grant from node 771, node 772 transitions to a failure state. If a clock at node 771 reaches monitor side time-to-die time 737 prior to receiving a renew request from node 772, node 771 suspects node 772 of failure.

Arbitration of Node Failures

Due to various different types of communication errors and node malfunctions, there exists some possibility that each node in a pair of nodes will suspect failure of the other node. Further, each node may suspect that it is functioning properly.

In some ring architectures, portions of resources are configured such that a single node controls a resource at a given moment in time. Further, the needed availability of some resources may also be high such that essentially constant control by a node is required. Thus, when a node fails, control of various resources may need to be transferred to another node. Accordingly, when a node in a pair of nodes suspects the other node of failure, arbitration mechanisms can be used to determine at least which node has or should fail.

For example, when each node in a pair nodes suspects the other node of failing, each node can transition to a timeout state and report their suspicion to an arbitration facility. When in a timeout state, certain other processing at each node can be suspended until the results of the arbitration are received. The arbitration facility can report back to a node indicating if it is to remain active. For example, an arbitration facility can send an accept message to a reporting node that is to remain active. The arbitration facility can send a deny message to a reporting node that is to transition to a failure state. A node that receives an accept message can remain active. A node that doesn't not receive an accept message (e.g., due to network conditions) or that receives a deny message transitions to a failure state.

Figure 7C:
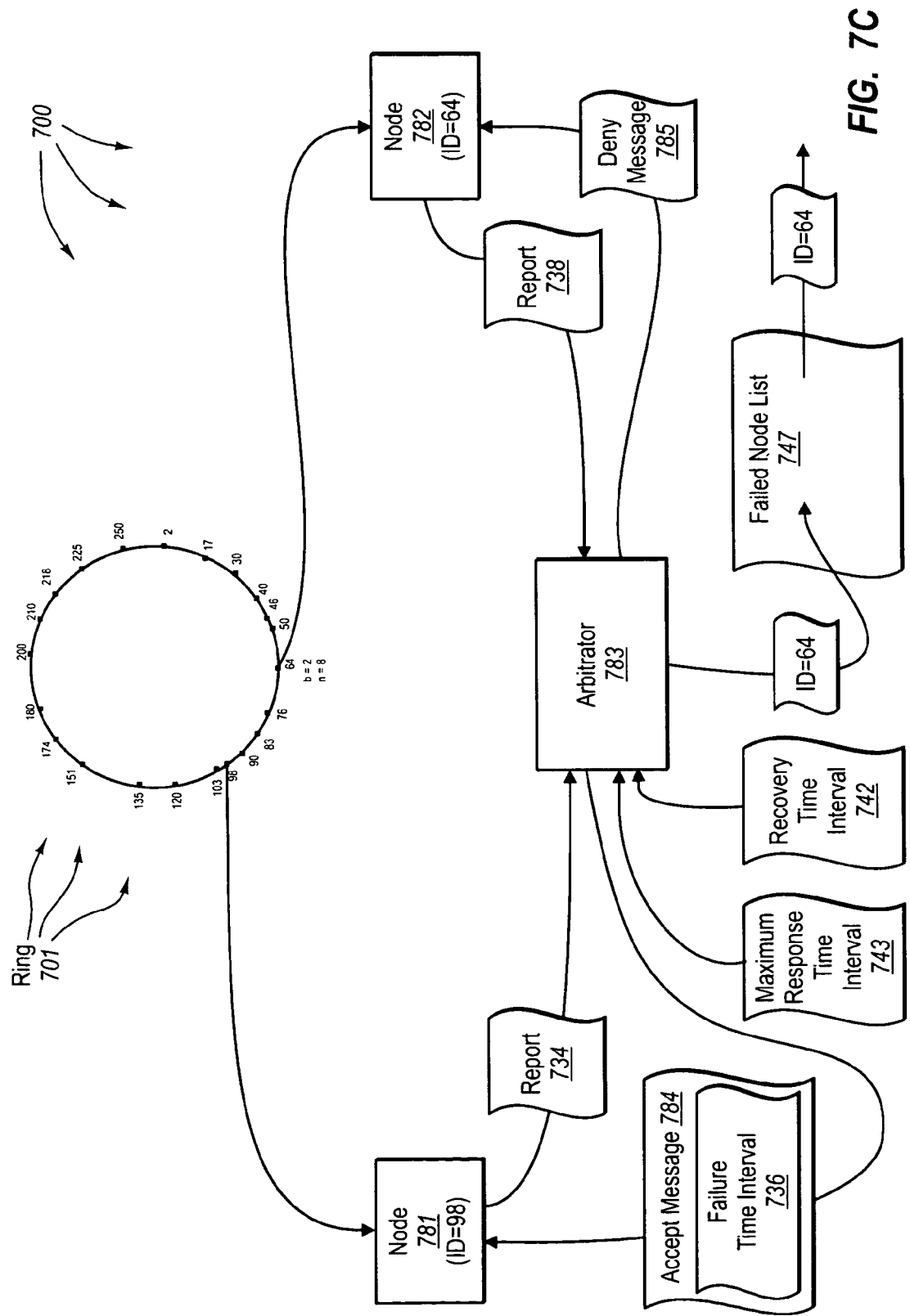
FIG. 7C illustrates an example ring architecture that facilitates arbitration when mutually monitoring nodes can each report that the other node is suspected of failing.

FIG. 7C illustrates example ring architecture 700 that facilitates arbitration when mutually monitoring nodes each can report that the other node is suspected of failing. FIG. 7C depicts an expanded view of node 781 (having ID=98), monitor node 782 (having ID=64), and arbitrator 783.

In some embodiments, arbitrator 783 is also a member of ring 701. In other embodiments, arbitrator 783 is a member of an ancestor ring of ring 701 but is not member of ring 701. In further embodiments, arbitrator 783 is external to the ring hierarchy that includes ring 701. For example, arbitrator 783 can be included in a separate arbitration federation ring of nodes. Nodes in the arbitration federation can be configured as arbitrators for the nodes of ring 701 and its ancestors.

In some embodiments, arbitrator 783 is mutually agreed to by node 771 and node 782 to arbitrate for nodes 781 and 782. In other embodiments, arbitrator 783 is assigned to arbitrate for nodes 781 and 782 by another entity. The other entity can be a node internal to the ring hierarchy including ring 701 (e.g., a seed node) or, for example, a human administrator. For example, the other node can be a member of ring 701 or a member of an ancestor ring of ring 701 but not member of ring 701. Alternately, the other entity can be external the ring hierarchy including ring 701. For example, the other entity can be a node that is a member of separate arbitration federation ring.

Arbitrator 783 can have varying knowledge of the ring hierarchy including ring 701. For example, arbitrator 783 can have global knowledge of the ring hierarchy including ring 701. Alternately, arbitrator 783 can have knowledge of some subset of rings included the ring hierarchy including ring 701. In other embodiments, arbitrator 783 has knowledge of a subset of nodes in ring 701 including (and potentially only) nodes 781 and 782.

Arbitrator 783 can be configured to arbitrate for any number of node pairs including, but not limited to, nodes 781 and 782. In some embodiments, an arbitration mechanism has no knowledge of nodes it is to arbitrate for prior to receiving a report of a suspected node failure. Thus, although a pair of nodes have agreed to use arbitrator 783 or arbitrator 783 has been assigned to arbitrate for a pair of nodes, arbitrator 783 may be unaware of any agreement or assignment prior to receiving a repot of a suspected node failure for a node in the pair of nodes.

Arbitration can include arbitrating between nodes that present conflicting failure reports. For example, when a first node is monitoring a second node and the second node is also monitoring the first node, it may be that each node reports that the other node is suspected of failure. The suspected failure can be detected using virtually any failure detection mechanisms including those previously described in this document.

Failed node list 747 can include a list of nodes that have been reported as suspected failed nodes. Nodes can be report other nodes as suspected failed nodes to arbitrator 783 and, when appropriate, arbitrator 783 can include the reported nodes in failed node list 747. Arbitrator 783 can remove failed nodes from failed node list 747 after appropriate periods of time (e.g., at a future time when the likelihood of continued conflict is not possible). For example, entries in failed node list 747 can be removed at recovery time interval 742 after they were inserted into failed node list 747. Recovery time interval 742 can be long enough to insure that nodes that have been told to fail do fail.

In some embodiments, an arbitrator arbitrates between conflicting reports of suspected node failures. To facilitate arbitration, a first node sending a report to an arbitration facility that a second node is suspected of failing. For example, node 781 can send report 734 to arbitrator 783. The arbitrator receives a report from the first node that the second node is suspected of failing. For example, arbitrator 783 can receive report 734 from node 781.

The arbitrator can determine that no other node has suspected the first node of failing within a specified recovery time interval prior to receiving the report from the first node. For example, arbitrator 783 can determine that no other node has suspected node 781 of failing within recovery time interval 742 (after which arbitrator 783 would have removed node 781 from failed node list 747 anyway). The arbitrator recording in a list that the second node is in a failure state. For example, arbitrator 783 can record in failed node list 747 that node 782 (ID=64) is in a failure state.

The arbitrator sending an accept message to the first node within a maximum response time interval, the accept message including a failure time value indicative of a time period after which the second node is guaranteed to transition into a failure state. For example, arbitrator 783 can send accept message 784 to node 781 within maximum response time interval 743 of receiving report 734. Accept message 784 includes failure time interval 736 indicative of a time when node 782 is guaranteed to have transitioned into a failure state. Generally, a maximum response time interval represents a point in time after which a requester (e.g., node 781 or 782) assumes an arbitration facility (arbitrator 783) will not answer a request for arbitration (e.g., report 734 or 738). When a maximum response time interval expires at a requester subsequent to sending a request for arbitration, the requester performs similar (and potentially identical) operations to those that would be performed if an express deny message was received.

The first node receiving an accept message from the arbitration facility within a maximum response time interval, the accept message including a time value indicative of a time period after which the second node is guaranteed to transition into a failure state. For example, node 781 can receive accept message 784, including failure time interval 736, from arbitrator 783. Failure time interval 736 is indicative of a time when node 782 is guaranteed to have transitioned into a failure state. Thus, after the expiration of failure time interval 736, node 781 can attempt to claim control of one or more ring resources previously controlled by node 782.

The first node claims control of one or more ring resources previously controlled by the second node subsequent to expiration of the time period. For example, node 781 can claim control of one or more ring resources within ring 701 previously controlled by the node 782 subsequent to expiration of failure time interval 736.

Claimed ring resources can vary depending on the ring resources controlled by node 782 prior to transition to a failure state. For example, node 781 can assume message routing responsibilities of node 782 (e.g., the responsibility to receive messages directed to a range of identifies on ring 701), any seed node responsibilities of node 782, any arbitration responsibilities of node 782, etc.

At some time at or after the first node reports the second node, the second node may also suspect the first node of failure. For example, it may be that node 782 also suspects node 781 of failure.

The second node sends a report to the arbitration facility that the first node is suspected of failing. For example, node 782 can send report 738 to arbitrator 783 that node 781 is suspected of failure. The arbitrator receives a report from the second node that the first node is suspected of failing, the report from the second node received within the specified recovery time interval subsequent to receiving the report from the first node. For example, arbitrator 783 can receive report 738 from node 782 that node 781 is suspected of failure within recovery time interval 742 of receiving report 734.

The arbitrator referring to the list to determine that the second node is to transition to a failure state. For example, arbitrator 783 can refer to failed node list 747 to determine that node 782 (ID=64) is to transition to a failure state.

The arbitrator sends a deny message to the second node to cause the second node to transition into a failure state. For example, arbitrator 783 can send deny message 785 to node 782 to cause node 782 to transition to a failure state. Method 2100 includes an act of the second node receiving a deny message from the arbitration facility. For example, node 782 can receive deny message 785 from arbitrator 783.

The second node transitioning into a failure state. For example, node 782 can transition into a failure state in response to receiving deny message 785. After failing, node 782 can subsequently attempt to rejoin ring 701.

Routing in Accordance with Cached Agreements

In some embodiments, messages are routed in accordance with cached routing agreements. For example, adjacent nodes of a ring can agree to a division of responsibility for a range of unoccupied identifiers between the adjacent nodes. An identifier can be unoccupied for any number of reasons. For example, an identifier may be unoccupied because the identifier is unassigned (i.e., the identifier that has not been assigned to a node). For assigned identifiers (i.e., identifiers that have been assigned to a node), an identifier may be unoccupied because the corresponding node has been deliberately shutdown or the node is for some reason, such as, for example, due to communication or node failures, otherwise unreachable.

Routing agreements between nodes can be established and cached prior to nodes being permitted to accept messages for and deliver messages for any of the unoccupied identifiers that are to be the responsibility of the adjacent nodes. Reference to a cached routing agreement significantly reduces any communication between (potentially) adjacent nodes that may otherwise occur to determine which node is responsible for a specific unoccupied identifier.

A cached routing agreement can divide a range of unoccupied identifiers in an arbitrary fashion, in accordance with configurable rules, or in accordance with a fixed methodology. In some embodiments, a range of identifiers between adjacent nodes on a ring is divided essentially in half This reduces the likelihood of an unoccupied identifier being further from a node that is responsible for the unoccupied identifier.

When there is an even number of unoccupied identifiers between adjacent nodes, the midway point between the adjacent nodes is between unoccupied identifiers. Thus, responsibility for the unoccupied identifiers can be divided at the midway point between the adjacent nodes. Accordingly, each adjacent node can be assigned responsibility for an equal number of unoccupied identifiers.

On the other hand, when there is an odd number of unoccupied identifiers between adjacent nodes, the midway point between the adjacent nodes is at an unoccupied identifier. Thus, responsibility for the unoccupied identifiers can be divided at one side or the other of the unoccupied identifier that is the midway point. Accordingly, one adjacent node can be assigned responsibility for one more unoccupied identifier than the other adjacent node.

Figure 8A:
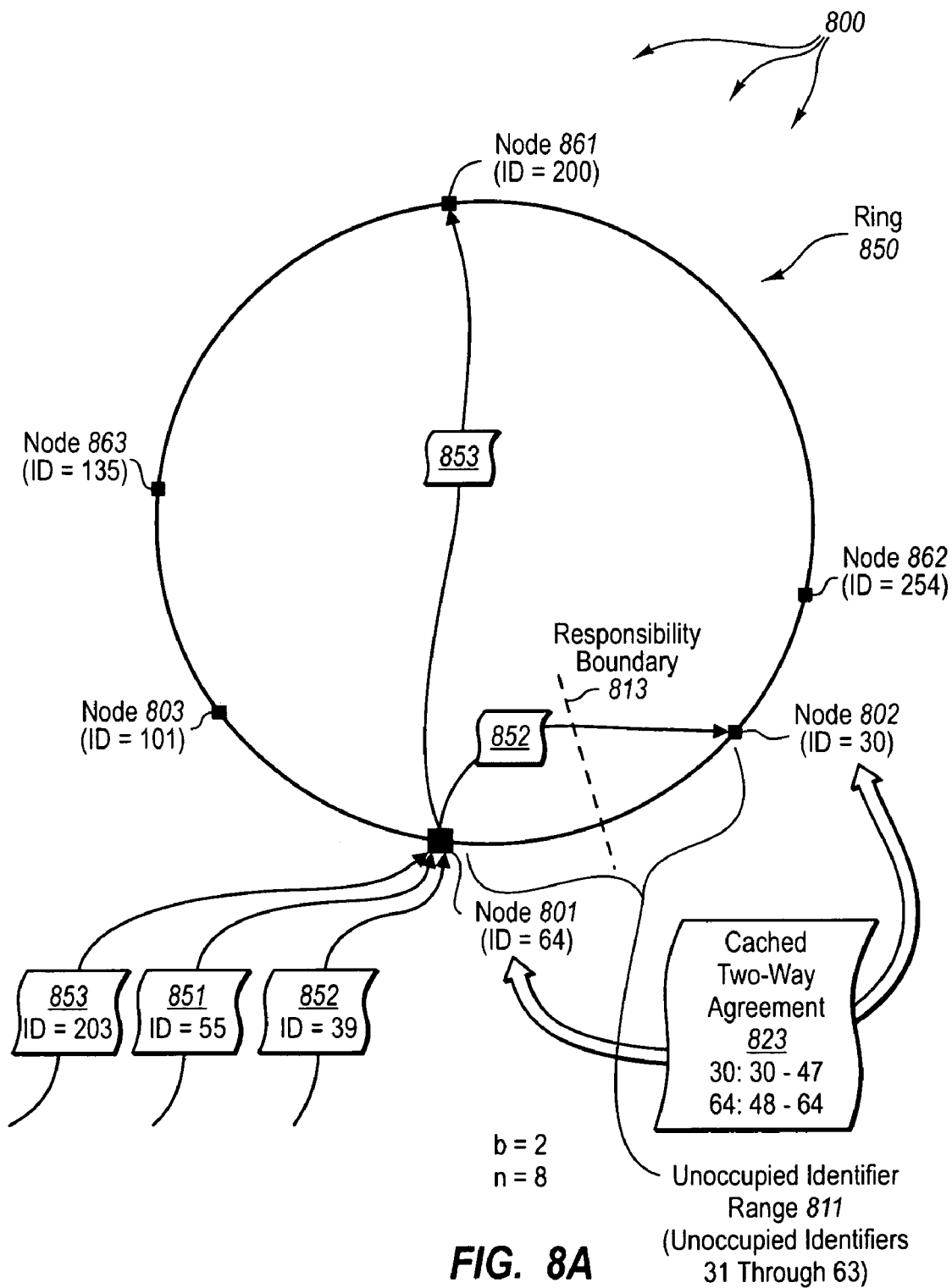
FIG. 8A illustrates an example ring architecture that facilitates routing a message in accordance with a cached two-way agreement.

Single two-way agreements: For example, referring now to FIG. 8A, FIG. 8A illustrates an example ring architecture 800 that facilitates routing a message in accordance with a cached two-way agreement between nodes. As depicted, various nodes (shown as squares on ring 850) including (but not limited to) nodes 801, 802, 803, 861, 862, and 863 are included on ring 850. Each node has a corresponding ID (shown in parenthesis) indicating its position on ring 850. For example, node 801 has ID=64 and node 802 has ID=30.

There are ranges of unoccupied identifiers between the depicted nodes. For example, unoccupied identifier range 811 represents unoccupied identifiers 31 through 63 between nodes 802 and 801.

As depicted, node 801 and 802 have established and cached two-way agreement 823. For example, through prior communication, nodes 801 and 802 can determine that there are no other nodes currently interspersed between ID=64 and ID=30. Thus, nodes 801 and 802 can further determine that they are adjacent to one another on ring 850. Accordingly, node 801 and 802 can divide responsibility for unoccupied identifier range 811 (i.e., unoccupied identifiers 31 through 63) such that node 802 is responsible for a portion of unoccupied identifier range 811 and node 801 is responsible for the remaining portion unoccupied identifier range 811. Each node is also responsible for its assigned ID. That is, node 802 is responsible for ID=30 and node 801 is responsible for ID=64.

Accordingly, as depicted by responsibility boundary 813 (between unoccupied identifier 47 and unoccupied identifier 48), node 802 (ID=30) is responsible for itself as well as unoccupied identifiers 31 through 47 and node 801 (ID=64) is responsible for itself as well as unoccupied identifiers 48 through 63. Although the midway point between nodes 801 and 802 is at unoccupied identifier 47, node 802 is assigned responsibility for unoccupied identifier 47 such that each unoccupied identifier is the responsibility of a single node. Thus, as previously described, when a responsibility boundary falls on an unoccupied identifier, one of the adjacent nodes can be assign the sole responsibility for the unoccupied identifier.

In some embodiments, a message is routed in accordance with a cached two-way agreement. A receiving node receives a message along with a destination identifier indicating a destination on the ring of nodes, the destination identifier located between the receiving node and one of the immediate neighbor nodes. For example, node 801 can receive message 851, indicated for delivery to ID=55. Alternately, node 801 can receive message 852, indicated for delivery to ID=39. Message 851 and 852 can be received from another node in ring 850 (intra-ring communication), from a node in another ring of ring architecture 800 (inter-ring communication), or through non-ring communication.

The receiving node refers to a cached two-way agreement between the receiving node and the immediate neighbor node to determine the next appropriate node that is to receive the message. The two-way agreement at least implies a division of responsibility for the identifier space between the receiving node and an immediate neighbor node. For example, node 801 can refer to cached two-way agreement 823 to determine the next appropriate node that is to process message 851. Since cached two-way agreement 823 indicates that node 801 (ID=64) is responsible for unoccupied identifier 55, node 801 determines that it is the appropriate node to process message 851. Likewise, node 801 can refer to cached two-way agreement 823 to determine the next appropriate node that is to process message 852. Since cached two-way agreement 823 indicates that node 802 (ID=30) is responsible for unoccupied identifier 39, node 801 determines that node 802 is the next appropriate node that is to process message 852.

The message is sent to the next appropriate component based on the determination of the next appropriate node. For example, node 801 can provide message 851 to its resource handler instance corresponding to unoccupied identifier 55, since cached two-way agreement 823 indicates that node 801 is responsible for unoccupied identifier 55. Alternately, node 801 can provide message 852 to node 802, since cached two-way agreement 823 indicates that node 802 is responsible for unoccupied identifier 39. Subsequently, node 802 can provide message 852 to its resource handler instance corresponding to unoccupied identifier 39.

When an identifier is not included in a cached two-way agreement, a node can refer to a routing table (e.g., as depicted in FIG. 6) to make progress towards a destination. For example, node 801 can send message 853, indicated for delivery to ID=203, to node 861 (ID=200). Node 861 can then refer to any cached two-way agreements with its adjacent nodes to determine the node that is responsible for identifier 203.

Figure 8B:
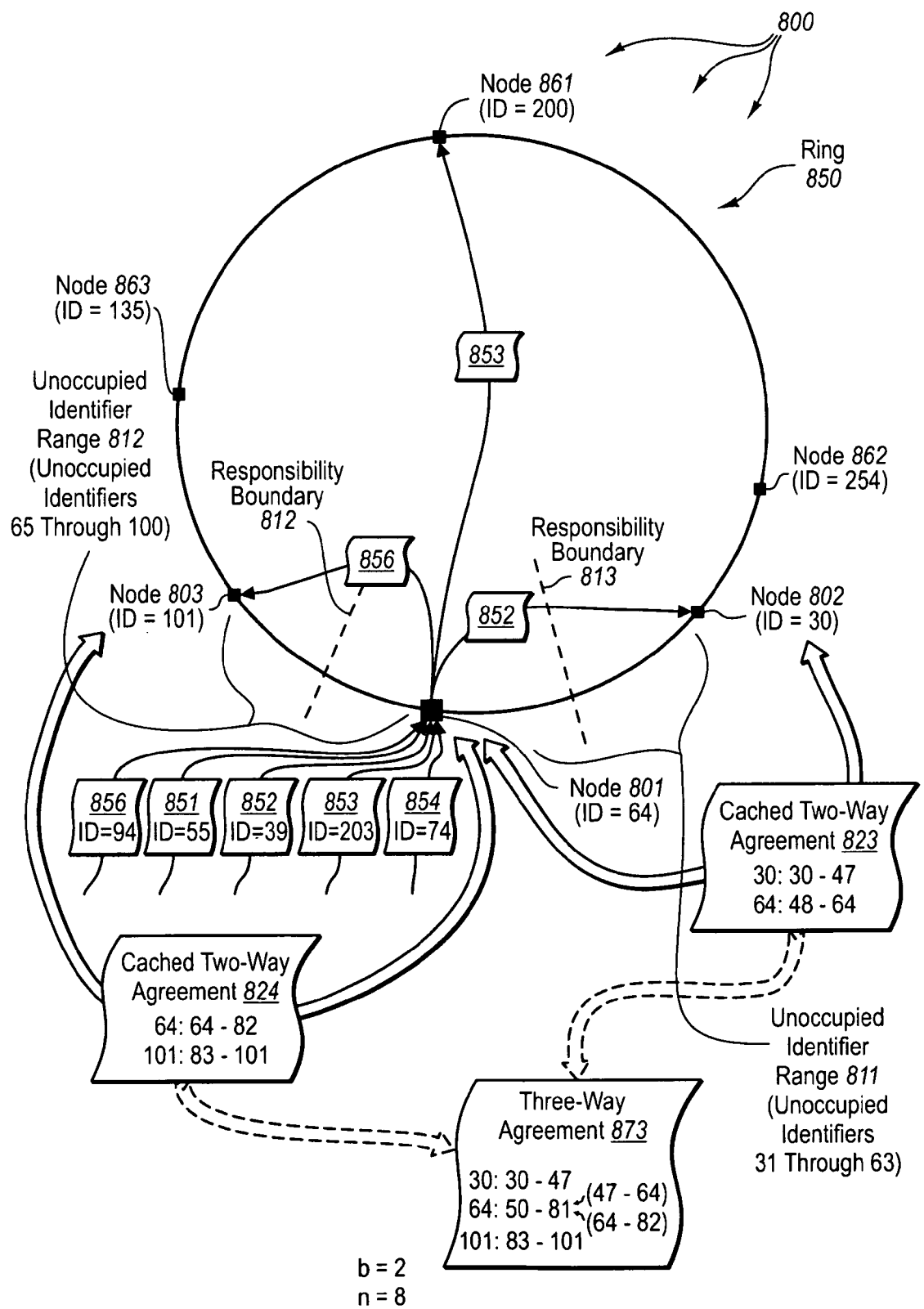
FIG. 8B illustrates an example ring architecture that facilitates routing a message in accordance with multiple cached two-way agreements.

Multiple two-way agreements: In some embodiments, multiple two-way agreements can, from the perspective of a given node, essentially represent a three-way agreement between the given node, the given node's immediate predecessor node, and the given node's immediate successor node. FIG. 8B illustrates the example ring architecture 800 that facilitates routing a message in accordance with multiple cached two-way agreements.

As previously described, nodes 801 and 802 can establish cached two-way agreement 823. Similarly, nodes 801 and 803 can establish cached-two way agreement 824 to divide responsibility for unoccupied identifier range 812 (i.e., unoccupied identifiers 65 through 101). Thus, through prior communication, nodes 801 and 803 can determine that there are no other nodes currently interspersed between ID=65 and ID=101. Thus, nodes 801 and 803 can further determine that they are adjacent to one another on ring 850. Accordingly, nodes 801 and 803 can divide unoccupied identifier range 812 such that node 802 is responsible for a portion of unoccupied identifier range 812 and node 801 is responsible for the remaining portion of unoccupied identifier range 812. Accordingly, as depicted within two-way agreement 824, node 801 (ID=64) is responsible for itself as well as unoccupied identifiers 65 through 82 and node 802 (ID=101) is responsible for itself as well as unoccupied identifiers range 83 through 100.

From the perspective of node 801, the combination of cached two-way agreement 823 and cached two-way agreement 824 essentially represents three-way agreement 873. That is, node 801 is responsible for a portion of identifier space between node 801 and node 802 and is responsible for a portion of identifier space between node 801 and node 803. The parenthetical ranges of identifiers indicate the ranges of responsibility (i.e., 47 through 64 and 64 through 82) form the cached-two way agreements 823 and 824 on either side of node 801.

In some embodiments, a message is routed in accordance with multiple cached two-way agreements. A receiving node receives a message along with a destination identifier indicating a destination on the ring of nodes. For example, node 801 can receive any of messages 851, 852, 853, 854, and 856 indicated for delivery to ID=55, ID=39, ID=203, ID=74, and ID=94 respectively. Messages 851, 852, 853, 854, and 856 can be received from another node in ring 850 (intra-ring communication) or from a node in another ring of ring architecture 800 (inter-ring communication), or through non-ring communication.

The receiving node refers to a first cached two-way agreement with the predecessor node and a second cached two-way agreement with the successor node to determine the next appropriate node that is to receive the message (act 2502). The first and second cached two-way agreements at least imply a division of responsibility for the identifier space between the predecessor node and the successor node. For example, node 2201 can refer to cached three-way agreements 823 and 824 to determine the next appropriate node that is to receive any of messages 851, 852, 853, 854, and 856.

Since cached two-way agreement 823 indicates that node 802 (ID=30) is responsible for unoccupied identifier 39, node 801 determines that node 802 is the next appropriate node that is to process message 852. Since cached two-way agreement 823 indicates that node 801 (ID=64) is responsible for unoccupied identifier 55, node 801 determines that it is the appropriate node to process message 852. Since cached two-way agreement 824 indicates that node 801 (ID=64) is responsible for unoccupied identifier 74, node 801 determines that it is the appropriate node to process message 854. Since cached two-way agreement 824 indicates that node 803 (ID=101) is responsible for unoccupied identifier 94, node 801 determines that node 803 is the next appropriate node that is to process message 854.

The message is sent to the next appropriate component based on the determination of the next appropriate node. For example, node 801 can send messages 851, 852, 853, 854, and 856 to the next appropriate component on ring 850 based on the determination of the next appropriate node that is to process messages 851, 852, 853, 854, and 856.

For example, node 801 can provide message 852 to node 802, since cached two-way agreement 823 indicates that node 802 is responsible for unoccupied identifier 39. Subsequently, node 802 can provide message 852 to its resource handler instance corresponding to unoccupied identifier 39. Node 801 can provide message 851 to its resource handler instance corresponding to unoccupied identifier 55, since cached two-way agreement 823 indicates that node 801 is responsible for unoccupied identifier 55. Node 801 can provide message 854 to its resource handler instance corresponding to unoccupied identifier 74, since cached two-way agreement 824 indicates that node 801 is responsible for unoccupied identifier 74. Node 801 can provide message 856 to node 803, since cached two-way agreement 824 indicates that node 803 is responsible for unoccupied identifier 94. Subsequently, node 803 can provide message 856 to its resource handler instance corresponding to unoccupied identifier 94.

When an identifier is not included in a cached either of multiple cached two-way agreements, a node can refer to a routing table (e.g., as depicted in FIG. 3) to make progress towards a destination. For example, node 801 can send message 856, indicated for delivery to ID=203, to node 861 (ID=200). Node 861 can then refer to a any cached two-way agreements with its predecessor node and/or its successor node to determine the next appropriate component that is to receive message 853.

Formulating Cached Agreements

Rings can be reconfigured from time to time, such as, for example, when a new node joins a ring or when an existing node departs a ring (e.g., through graceful removal, as a result of node monitoring, through reference to an arbitrator, etc.). When a node detects that the configuration of a ring has changed, the node can reformulate cached routing agreements with any adjacent nodes. During agreement reformulation, the node can queue any received messages, expect those for formulating the agreement. After formulation of the agreement is complete, the node can then process the messages in accordance with the agreement.

Reconfiguration of a ring can cause multiple routing agreements to be reformulated. For example, when a node departs a ring, immediately adjacent nodes on either side of the departing node can formulate an agreement for the range of unoccupied identifiers that were previously the responsibility of the departing node (thus potentially gaining responsibility for additional unoccupied identifiers). This reformulation joins responsibility for a portion of the range of unoccupied identifiers from the departing node with the range of unoccupied identifiers for each immediately adjacent node. That is, each immediately adjacent node gains responsibility for a portion of the departing node's range of unoccupied identifiers and the departing node's identifier.

Figure 9A:
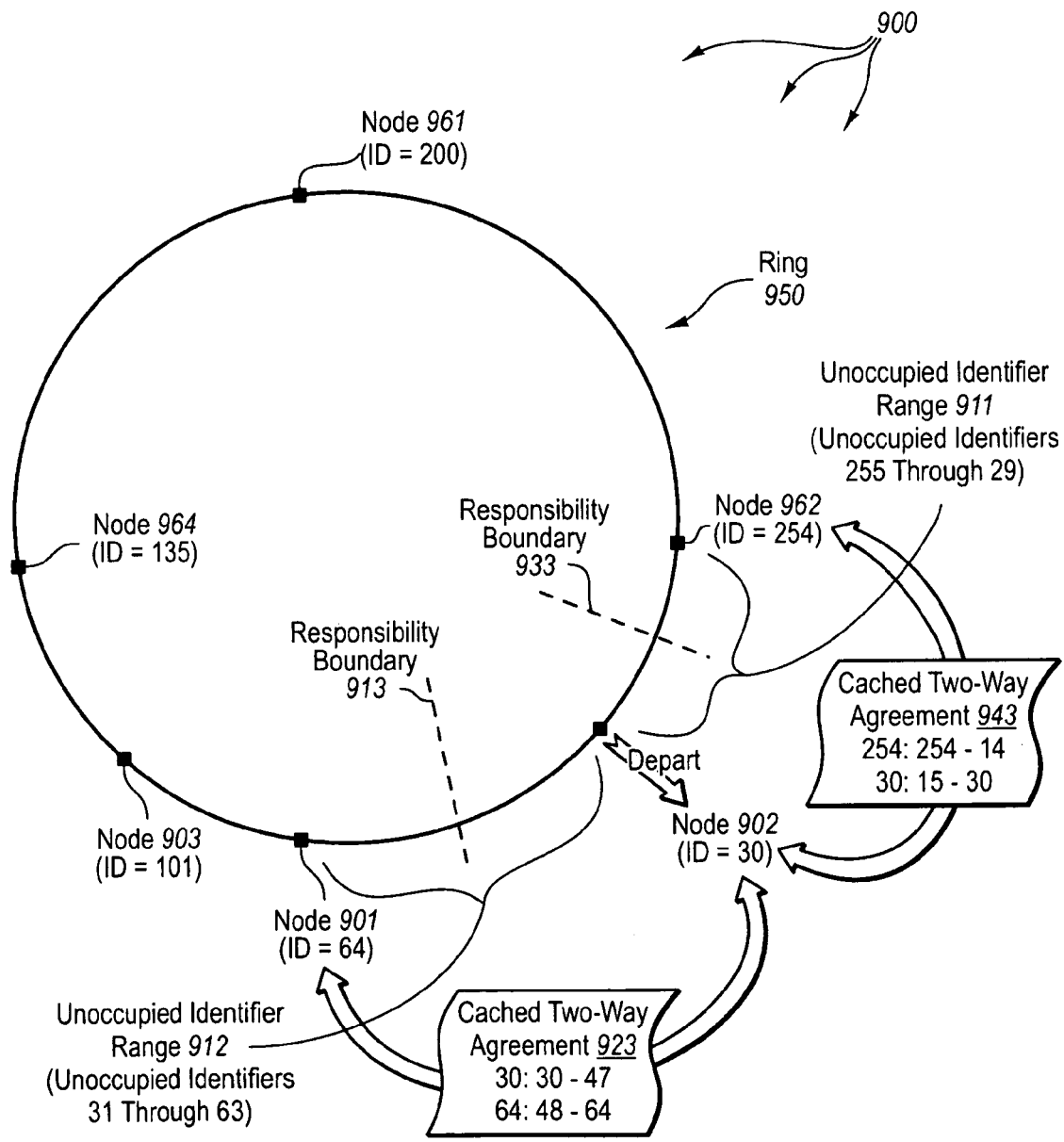
FIGS. 9A through 9D illustrate an example ring architecture that facilitates formulating a cached two-way agreement.

FIGS. 9A through 9D illustrate an example ring architecture 900 that facilitates formulating a cached two-way agreement. As depicted in FIG. 9A, nodes 901 and 902 have formulated cached two-way agreement 99 dividing responsibility for unoccupied identifier range 912 (i.e., unoccupied identifiers 31 through 63) at responsibility boundary 913 (between unoccupied identifier 47 and unoccupied identifier 48). Similarly, nodes 902 and 962 have formulated cached two-way agreement 943 dividing responsibility for unoccupied identifier range 911 (i.e., unoccupied identifiers 255 through 29) at responsibility boundary 933 (between unoccupied identifiers 14 and 15).

Figure 9B:
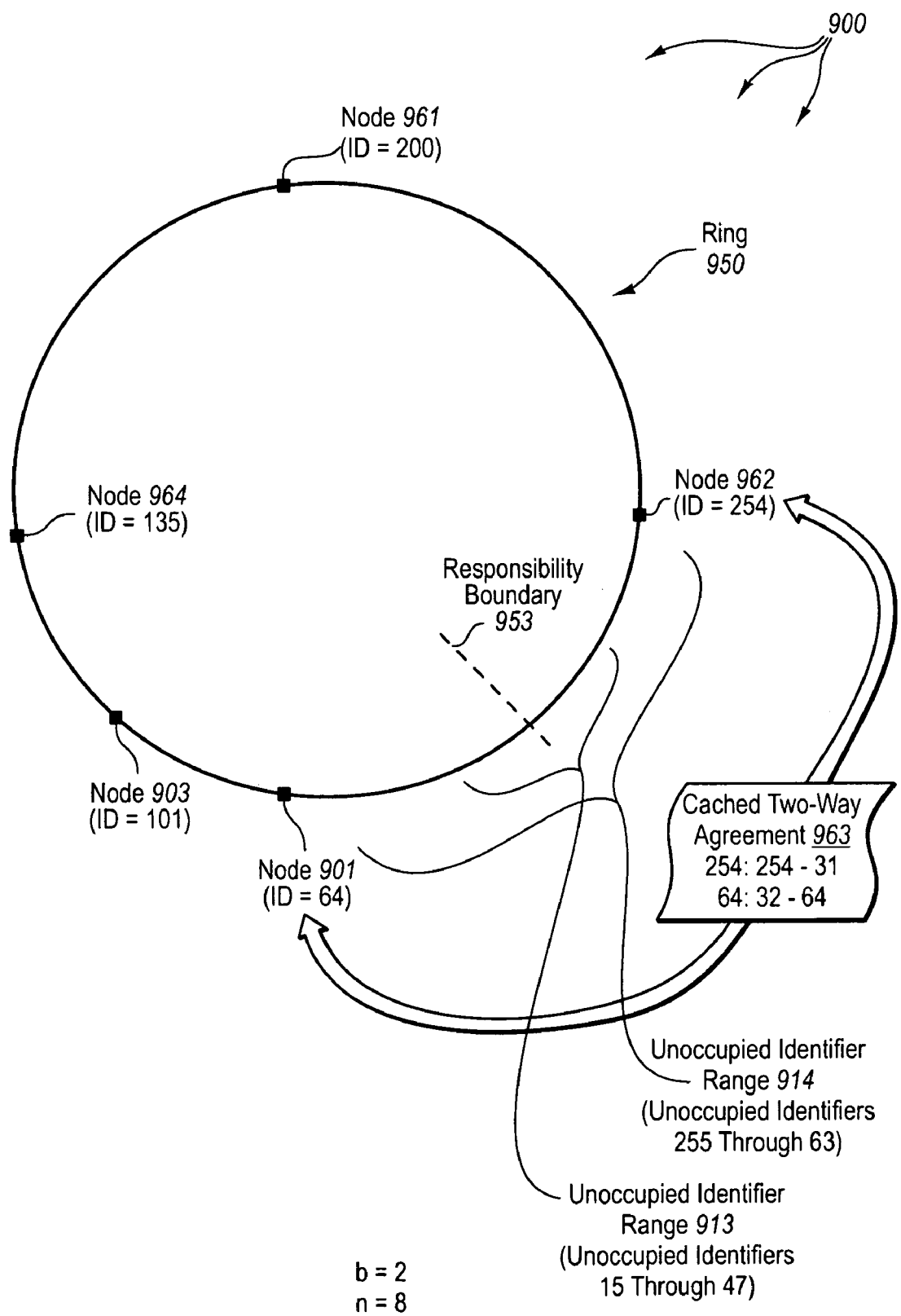

At some time subsequent to the formulation of cached two-way agreements 99 and 943, node 902 can leave ring 950 (e.g., through graceful removal, as a result of node monitoring, based on instructions from an arbitrator, etc.). Referring now to FIG. 9B, subsequent to node 902 leaving ring 950 there is no node responsible for the unoccupied identifiers that were previously the responsibility of node 902. Unoccupied identifier range 913 (unoccupied identifiers 15 through 47, including now unoccupied identifier 30) represents the range of unoccupied identifiers that node 902 was responsible for prior to departing ring 950.

In response to node 902 leaving ring 950, nodes 901 and 962 attempt to identify new immediate neighbor nodes. Node 962 attempts to identify a new immediate successor node (i.e., an immediate neighbor node in the same direction as node 902 relative to node 962). Node 901 attempts to identify a new immediate predecessor node (i.e., an immediate neighbor in the same direction as node 902 relative to node 901). In FIG. 9B, node 962 identifies node 901 as its new immediate successor and node 901 identifies node 962 as its new immediate predecessor.

Upon identifying new immediate neighbor nodes, nodes 962 and 901 formulate cached two-way agreement 963 to that divides responsibility for unoccupied identifier range 914 (unoccupied identifiers 255 through 63, including now unoccupied identifier 30). Unoccupied identified range 914 includes unoccupied identifier range 913, which was previously the responsibility of node 902. Thus, portions of unoccupied identifier range 913 can become the responsibility of either node 962 or node 901, after node 902 departs ring 950.

Accordingly, as depicted by responsibility boundary 953 (between unoccupied identifier 31 and unoccupied identifier 32), node 962 (ID=254) and node 901 (ID=30) formulate cached two-way agreement 963. In accordance with cached two-way agreement 963, node 962 (ID=254) is responsible for itself as well as unoccupied identifiers 255 through 31 and node 901 (ID=64) is responsible for itself as well as identifier range 32 through 63. Although the midway point between nodes 2201 and 2202 is at unoccupied identifier 31, node 962 is assigned responsibility for unoccupied identifier 31 such that each unoccupied identifier is the responsibility of a single node.

During time between the departure of node 902 and formulation of cached two-way agreement 963, nodes 901 and 962 do not process messages indicated for delivery to identifiers in the range between 255 and 63. Instead, nodes 901 and 962 queue any messages, expect those for formulating cached two-way agreement 963. After formulation of the cached two-way agreement 963 is complete, nodes 901 and 962 can then process the messages in accordance with cached two-way agreement 963.

When a new node joins a ring between two existing nodes, each existing node can formulate a routing agreement with the new node (and thus potentially giving up responsibility for a portion of unoccupied identifiers). This formulation can essentially split a range of unoccupied identifiers an existing node is responsible for between the joining node and the existing node. That is, each existing node potentially gives up responsibility for a portion of the existing node's unoccupied identifiers to the joining node.

Figure 9C:
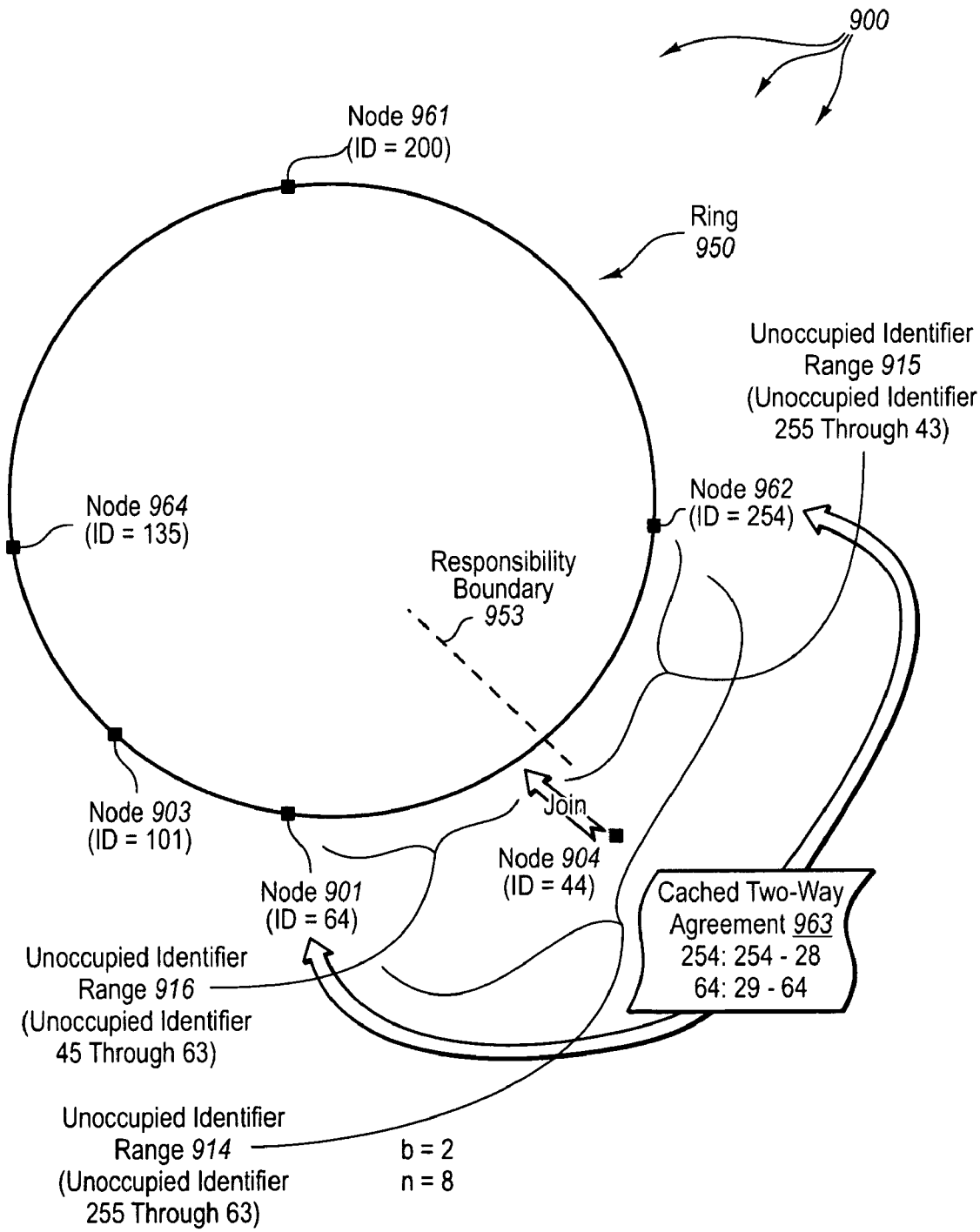

Referring now to FIG. 9C, at some time subsequent to the formulation of cached two-way agreement 963, node 904 (ID=44) can join ring 950. Subsequent to node 904 joining ring 950, node 962 can detect node 904 as its immediate successor. Likewise, node 901 can detect node 904 as its immediate predecessor. In response to each of the detections, unoccupied identifier range 914 is essentially split into unoccupied identifier range 915 (unoccupied identifiers 255 through 43) and unoccupied identifier range 916 (unoccupied identifiers 45 through 63). New cached-two way agreements can then be formulated to divide responsibility for unoccupied identifier ranges 915 and 916.

Figure 9D:
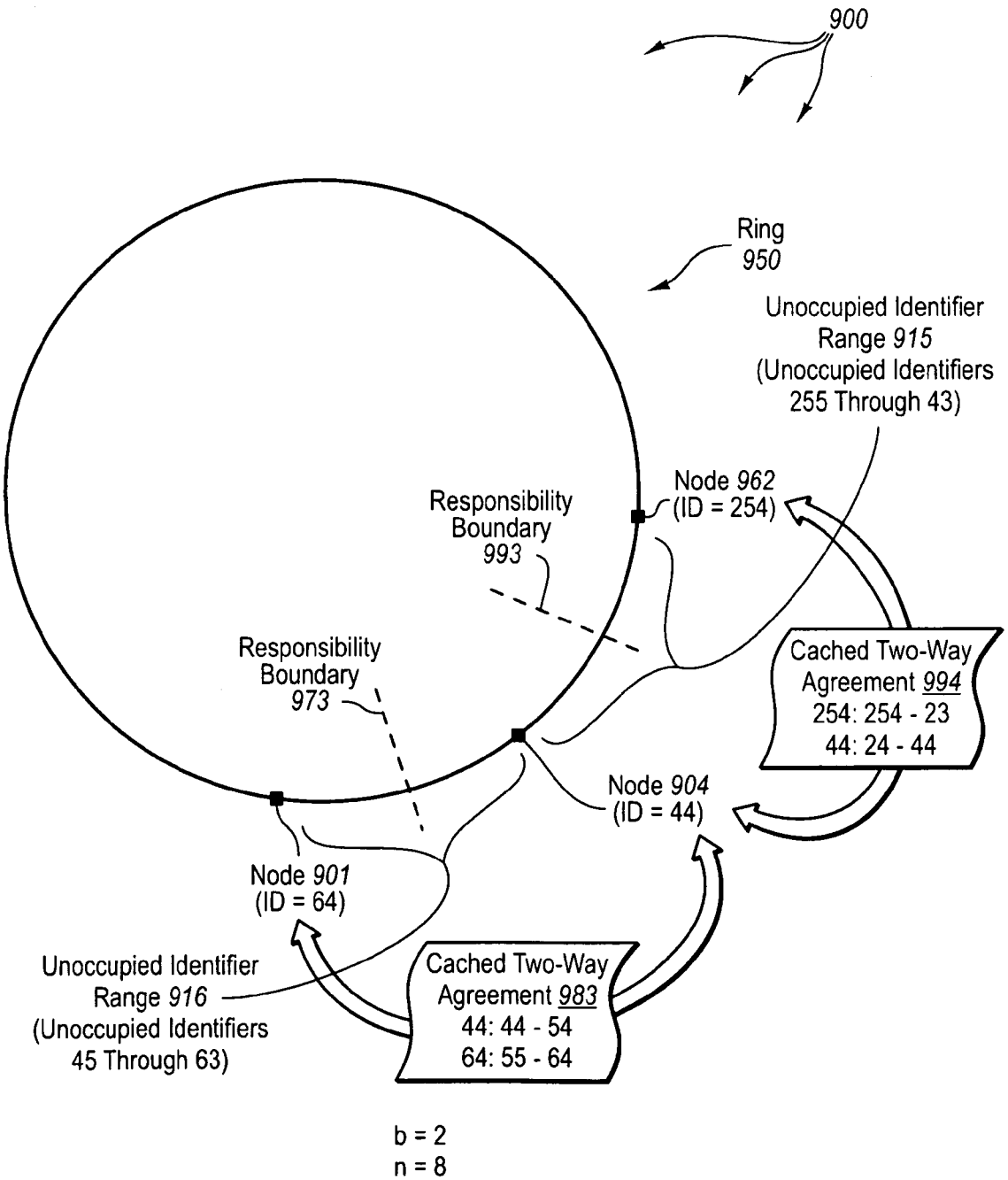

Referring now to FIG. 9D, upon identifying node 904 as a new immediate successor node, nodes 962 and 904 formulate cached two-way agreement 994 to that divides responsibility for unoccupied identifier range 915 (unoccupied identifiers 255 through 43). Unoccupied identified range 915 includes portions of unoccupied identifier range 914, which were previously the responsibility of node 962 and in this case some of which were previously the responsibility of node 901. Thus, portions of unoccupied identifier range 914 that were the responsibility of either node 962 or node 901, can become the responsibility of node 904 when node 904 joins ring 950.

Accordingly, as depicted by responsibility boundary 993 (between unoccupied identifier 9 and unoccupied identifier 24), node 962 (ID=254) and node 904 (ID=44) formulate cached two-way agreement 994. In accordance with cached two-way agreement 994, node 962 (ID=254) is responsible for itself as well as unoccupied identifiers 255 through 9 and node 904 (ID=44) is responsible for itself as well as identifier range 24 through 43. Although the midway point between nodes 2201 and 2202 is at unoccupied identifier 9, node 962 is assigned responsibility for unoccupied identifier 9 such that each unoccupied identifier is the responsibility of a single node.

Similarly, upon identifying node 904 as a new immediate predecessor node, nodes 901 and 904 formulate cached two-way agreement 983 that divides responsibility for unoccupied identifier range 916 (unoccupied identifiers 45 through 64). Unoccupied identified range 916 includes portions of unoccupied identifier range 914, which were previously the responsibility of node 901. Thus, portions of unoccupied identifier range 914, which were the responsibility of node 901, can become the responsibility of node 904 when node 904 joins ring 950.

Accordingly, as depicted by responsibility boundary 973 (between unoccupied identifier 54 and unoccupied identifier 55), node 904 (ID=44) and node 901 (ID=64) formulate cached two-way agreement 983. In accordance with cached two-way agreement 983, node 904 (ID=44) is responsible for itself as well as unoccupied identifiers 45 through 54 and node 901 (ID=64) is responsible for itself as well as identifier range 55 through 63. Although the midway point between nodes 2201 and 2202 is at unoccupied identifier 54, node 904 is assigned responsibility for unoccupied identifier 54 such that each unoccupied identifier is the responsibility of a single node.

During time between the joining of node 904 and formulation of cached two-way agreement 994, nodes 962 and 904 do not process messages indicated for delivery to identifiers in the range between 255 and 43. Instead, nodes 962 and 904 queue any messages, expect those for formulating cached two-way agreement 994. After formulation of the cached two-way agreement 994 is complete, nodes 962 and 904 can then process the messages in accordance with cached two-way agreement 994.

Similarly, during time between the joining of node 904 and formulation of cached two-way agreement 983, nodes 904 and 901 do not process messages indicated for delivery to identifiers in the range between 45 and 63. Instead, nodes 904 and 901 queue any messages, expect those for formulating cached two-way agreement 983. After formulation of the cached two-way agreement 983 is complete, nodes 904 and 901 can then process the messages in accordance with cached two-way agreement 983.

From the perspective of node 904, the combination of cached two-way agreement 994 and cached two-way agreement 983 can essentially represent a corresponding three-way agreement (not shown) between node 904, node 962, and 901. From the perspective of node 904, the corresponding represented three-way agreement defines responsibility for (assigned and unoccupied) identifiers from and including ID=254 to and including ID=64.

In some embodiments modes perform a method for joining a two-way agreement. A current node accesses an indication that the configuration of the ring of nodes has changed, the indication indicative of a need to formulate a two-way agreement dividing responsibility for at least unoccupied identifiers on the ring between the current node and the immediate neighbor node. For example, referring to FIGS. 9A and 9B, node 901 and/or node 902 can access an indication, for example, from node 902, through monitoring of node 902, or from an arbitrator, that node 902 departed ring 950. The indication of node 902 departing ring 950 indicates to node 901 and/or node 962 a need to formulate a two-way agreement dividing responsibility for unoccupied identifier range 914 (unoccupied identifiers 255 through 63).

Alternately, referring to FIGS. 9C and 9D, node 901 can access an indication (e.g., sent as part of the join process of node 904) that node 904 has joined ring 950. The indication of node 904 joining ring 950 indicates to node 901 a need to formulate a two-way agreement dividing responsibility for unoccupied identifier range 916 (unoccupied identifiers 45 through 63). Similarly, node 962 can access an indication (e.g., sent as part of the join process of node 904) that node 904 has joined ring 950. The indication of node 904 joining ring 950 indicates to node 962 a need to formulate a two-way agreement dividing responsibility for unoccupied identifier range 915 (unoccupied identifiers 255 through 43).

The current node and the immediate neighbor node agree to a responsibility boundary between the current node and the immediate neighbor node that is to divide responsibility for the unoccupied identifiers between the current node and the immediate neighbor node. Unoccupied identifiers between the current node and the responsibility boundary are the responsibility of the current node and unoccupied identifiers between the responsibility boundary and the immediate neighbor node are the responsibility of the immediate neighbor node.

For example, referring to FIG. 9B node 901 and node 962 can agree to responsibility boundary 953, which is essentially between unoccupied identifiers 31 and 32. Thus, unoccupied identifiers between node 901 and responsibility boundary 953 (i.e., unoccupied identifiers 32 through 63) are the responsibility of node 901. Likewise, unoccupied identifiers between responsibility boundary 953 and node 962 (i.e., unoccupied identifiers 255 through 31) are the responsibility of node 962.

Referring to FIG. 9D, node 901 and node 904 can agree to responsibility boundary 973, which is essentially between unoccupied identifiers 54 and 55. Thus, unoccupied identifiers between node 901 and responsibility boundary 973 (i.e., identifiers 55 through 63) are the responsibility of node 901. Likewise, unoccupied identifiers between responsibility boundary 973 and node 904 (i.e., unoccupied identifiers 45 through 54) are the responsibility of node 904.

Still referring to FIG. 9D, node 904 and node 962 can agree to responsibility boundary 993, which is essentially between unoccupied identifiers 9 and 24. Thus, identifiers between node 904 and responsibility boundary 993 (i.e., unoccupied identifiers 24 through 43) are the responsibility of node 904. Likewise, unoccupied identifiers between responsibility boundary 993 and node 962 (i.e., unoccupied identifiers 255 through 9) are the responsibility of node 962.

Aggregation When a Node Fails

Figure 10:
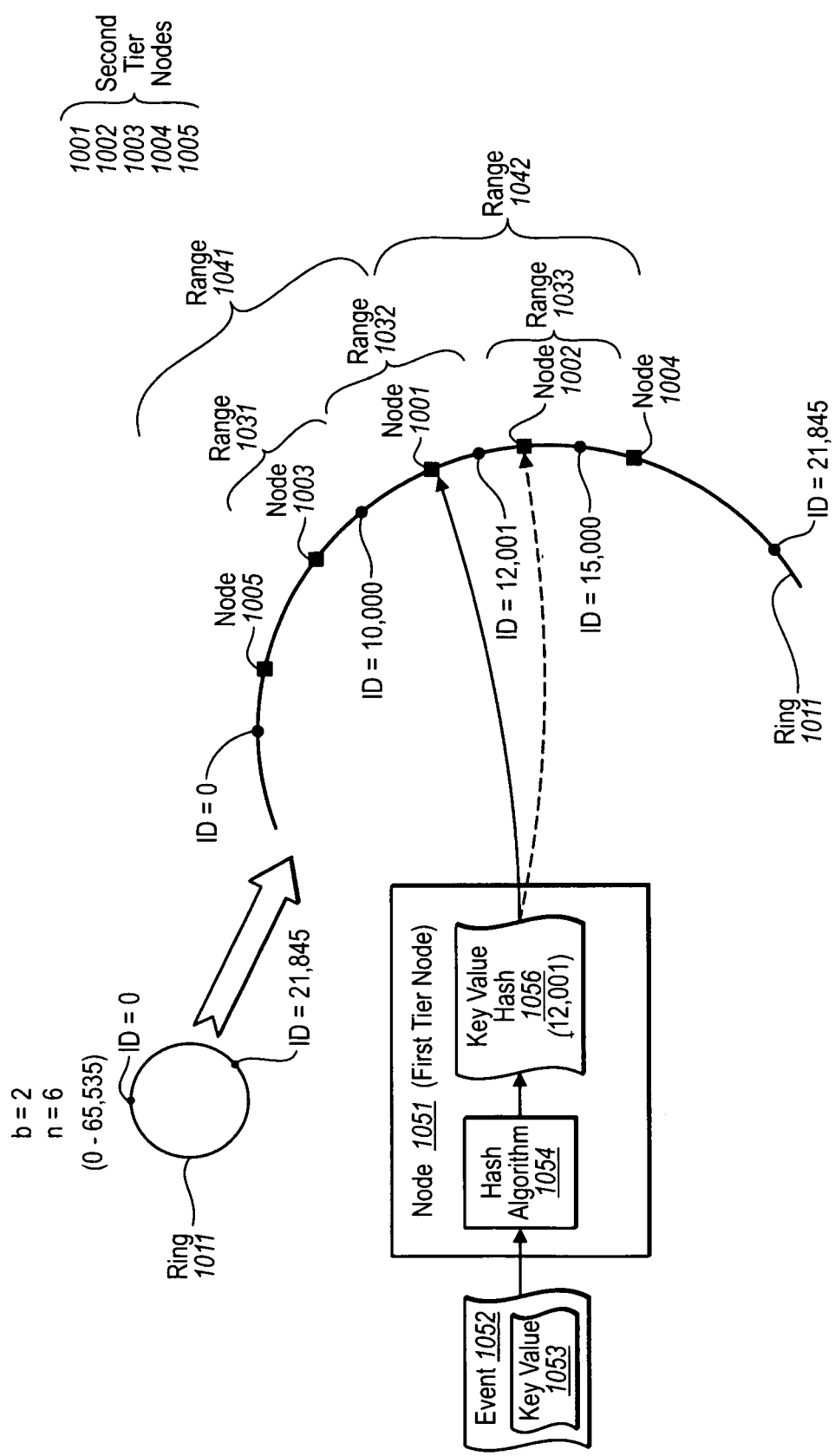
FIG. 10 illustrates an example computer architecture that facilitates multi-tier distributed aggregation on a ring overlay when a node fails.

Thus, in some embodiments there is potential for a node in aggregation infrastructure 200 to depart from a ring (e.g., fail) during aggregation. However, as previously described one or more other nodes can assume the responsibilities of a departing node. FIG. 10 illustrates an example computer architecture that facilitates multi-tier distributed aggregation on ring 1011 overlay when a node fails.

Although not expressly depicted, ring 1011 can include a plurality of first tier nodes that receive event streams (e.g., from one or more computer systems in event generation infrastructure 101) and pre-aggregate data. The first tier nodes send pre-aggregated data to a smaller plurality of second tier nodes when a recurring aggregation period occurs. The second tier nodes receive the pre-aggregated data and further pre-aggregated the data. The second tier nodes send the further pre-aggregated data to a central node (or to an even smaller plurality of third tier nodes) when the recurring aggregation period occurs. Eventually pre-aggregated data reaches the central node, which aggregates pre-aggregated data into aggregated data for further delivery.

As depicted, ring 1011 includes $2^{16}$ (or 65,536) different IDs. Second (and if applicable higher) tier nodes can be distributed on ring 1011 to assume responsibility for different ranges of IDs on ring 1011. For example, node 1003 is responsible for range 1031, node 1001 is responsible for range 1032, and node 1002 is responsible for range 1033. Nodes 1004 and 1005 can also be response for other ranges of IDs.

Node 1051 (a first tier node) can receive an event stream, including event 1052. Node 1051 can utilize hash algorithm 1051 to hash key value 1053 into Key value hash 1056. Hash algorithm 1051 can be an algorithm that converts a character string, such as, for example, a user ID, into a number between 0 and 65,535. Node 1051 can maintain a dictionary of key value hashes, potentially with corresponding usage data (e.g., similar to dictionary 321). When the recurring aggregation period occurs, node 1051 can route messages to each ID on ring 1011 that corresponds to a key value hash in its dictionary. For example, node 1051 can send a message containing pre-aggregated data for key ID 1053 to ID 12,001.

Ring 1011 can determine that ID 12,001 is in range 1032 and as a result that a node 1001 is responsible for ID 12,001. Accordingly, ring 1011 can route the message, containing pre-aggregated data for key value 1053, to node 1001.

If node 1001 departs ring 1011, nodes 1002 and 1003 can negotiate an assume responsibility for portions of range 1032. For example, node 1003 can become responsible for range 1041 and node 1002 can become responsible for range 1042. Subsequent to node 1001's departure, node 1051 can send another message containing pre-aggregated data for key value 1053 to ID 12,001. However, this time ring 1011 determines that ID 12,001 is in range 1042 and as a result that a node 1002 is responsible for ID 12,001. Accordingly, ring 1011 can route the message, containing pre-aggregated data for key value 1053, to node 1002.

Similar techniques can be used to divide responsibility for a portion of the ID space of ring 1011 for other higher tiers of nodes.

Figure 11:
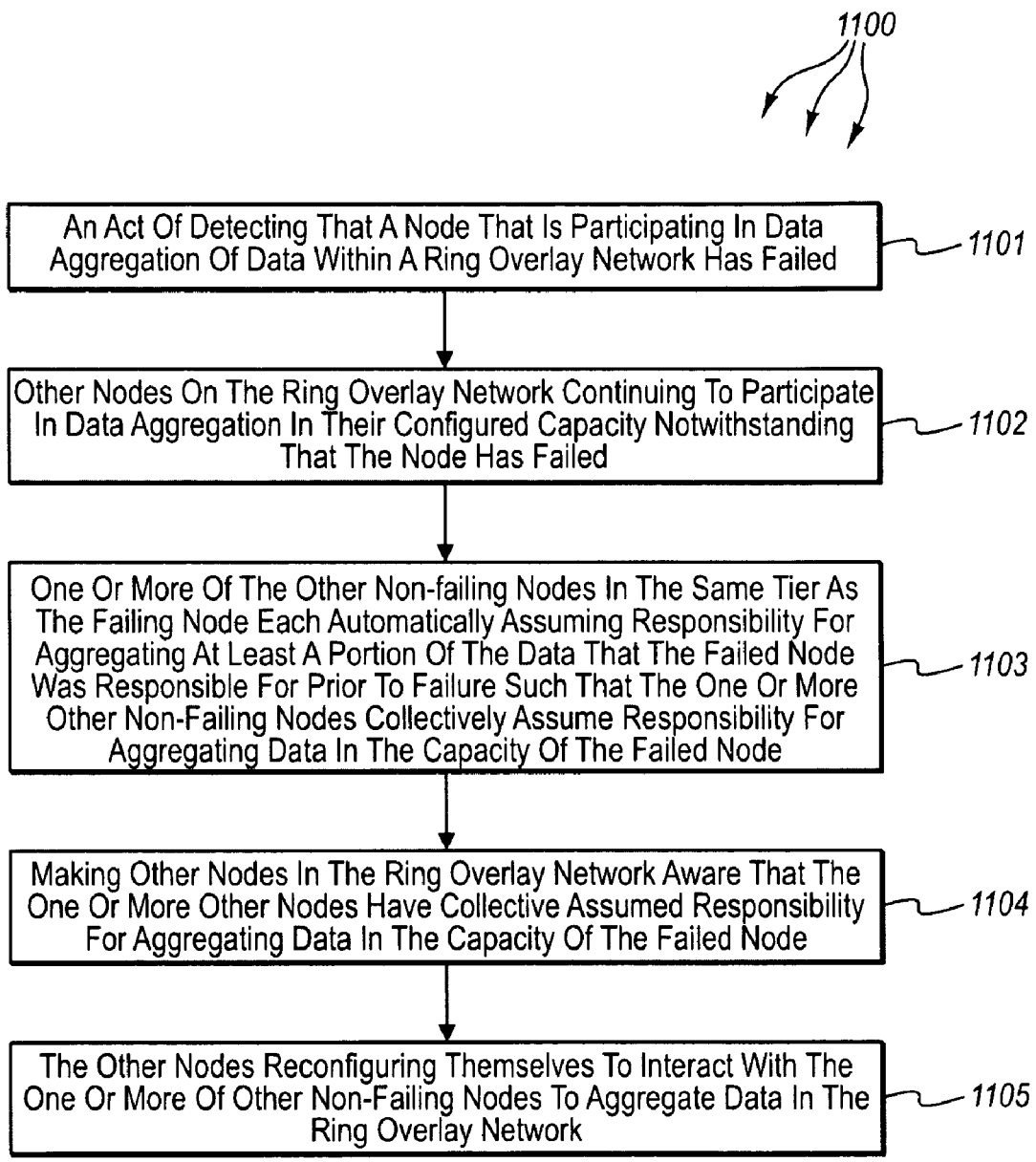
FIG. 11 illustrates an example flow chart of a method for recovering from a node failure during distributed aggregation.

FIG. 11 illustrates an example flow chart of a method 1100 for recovering from a node failure during distributed aggregation. Method 1110 will be described with respect to the components and data in FIG. 10.

Method 1100 includes an act of detecting that a node that is participating in aggregation of data within the ring overlay network has failed (act 1101). For example, ring 1011 (e.g., through neighborhood nodes) can detect that node 1001 has failed. Method 1100 includes an act of other nodes on the ring overlay network continuing to participate in aggregation in their configured capacity notwithstanding that the node has failed (act 1102). For example, nodes 1002, 1003, 1004, and 1005 can continue to process pre-aggregated data from first tier nodes that is sent to ID for which they are responsible.

Method 1100 includes an act of one or more of the other non-failing nodes in the same tier as the failing node each automatically assuming responsibility for aggregating at least a portion of the data that the failed node was responsible for prior to failure such that the one or more other non-failing nodes collectively assume responsibility for aggregating data in the capacity of the failed node (act 1103). For example, node 1003 can assume responsibility for the lower portion of the ID space in range 1032. Range 1031 and the lower portion of range 1032 can be merged into range 1041, representing the new portion of the ID space that node 1003 is responsible for. Similarly, node 1002 can assume responsibility for the higher portion of the ID space in range 1032. Range 1033 and the upper portion of range 1032 can be merged into range 1042, representing the new portion of the ID space that node 1003 is responsible for. Accordingly, nodes 1002 and 1003 collectively assume responsibility for aggregating data in the capacity of node 1001.

Method 1100 includes an act of making other nodes in the ring overlay network aware that the one or more other nodes have collective assumed responsibility for aggregating data in the capacity of the failed node (act 1104). For example, nodes 1003 and 1002 can indicate to their neighbors the new ranges of IDs they are responsible for. This information can be propagated throughout ring 1011 as appropriate using inter-ring communications.

Method 1100 includes an act of the other nodes reconfiguring themselves to interact with the one or more of other non-failing nodes to aggregate data in the ring overlay network (act 1105). For example, node 1005 can reconfigure its routing table to indicate that node 1003 is responsible for range 1041. Similarly, node 1004 can reconfigure its routing table to indicate that node 1002 is responsible for range 1042, including ID 12,001.

Accordingly, embodiments of the invention utilize tiers of nodes that are cascaded in a layered system. Each tier reduces the size of data by orders of magnitude through pre-aggregation. Thus, high volume streams of messages can be reduced to lower volume streams at large scales, such as, for example, the Internet. No central coordination is used; thus there is no central point of failure or bottleneck. When a node fails other nodes in the same tier as the failing node automatically take over the responsibilities of the failed node.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In an overlay network including a plurality of first tier nodes, a plurality of second tier nodes, and at least one other node, each of the plurality of first tier nodes configured to send pre-aggregated event related data to second tier nodes in accordance with a corresponding recurring aggregation period, each of the second tier nodes configured to send aggregate total data to the at least one other node, in accordance with a second corresponding recurring aggregation period, a method for aggregating event related data, the method comprising:

an act of a second tier node receiving pre-aggregated event related data and key values corresponding to one or more key IDs from a plurality of first tier nodes, wherein the second tier node has been has been partitioned to be responsible for the one or more key IDs within the overlay network;

an act of the second tier node aggregating the received pre-aggregated data for each of the one or more key IDs that the second tier node has been has been partitioned to be responsible for into an aggregate total for each of the one or more key IDs;

an act of the second tier node detecting that its corresponding recurring aggregation period has occurred; and an act of the second tier node sending the aggregate total for each of the one or more key IDs to at least one other node.

2. The method as recited in claim 1, wherein the overlay network is a ring overlay.

3. The method as recited in claim 2, wherein the act of a second tier node receiving pre-aggregated event related data from a plurality of first tier nodes for one or more key IDs that the second tier node has been has been partitioned to be responsible for comprises an act of receiving pre-aggregated event related data that was routed to an ID that the second tier node is responsible for within the ring ID space.

4. The method as recited in claim 1, wherein the second tier node aggregating received pre-aggregated data comprises an act of creating a dictionary entry for a key ID.

5. The method as recited in claim 1, wherein the second tier node aggregating received pre-aggregated data comprises an act of merging received data for a key ID with existing data in the data dictionary for the key ID.

6. The method as recited in claim 1, wherein the recurring aggregation period and the second recurring aggregation period have the same value.

7. The method as recited in claim 1, wherein the act of the second tier node sending the aggregate total for each of the one or more key IDs to at least one other node comprises an act of the second tier node sending the aggregate total for each of the one or more key IDs to a central node.

8. In an overlay network including a plurality of first tier nodes and at least one other node, each of the plurality of first tier nodes configured to periodically send pre-aggregated event related data to the at least one other node in accordance with a corresponding recurring aggregation period, a method for aggregating event related data, the method comprising:

an act of a first tier node receiving a plurality of event related messages, each event related message containing event related data and a key value corresponding to one or more of a plurality of different key IDs;

an act of the first tier node pre-aggregating event related data from each received message within a local dictionary, wherein event related data corresponding to each particular key ID is aggregated within the local dictionary with the event related data for each other message corresponding to the same particular key ID, including at least aggregating event related data in a first message corresponding to a specified key ID with event related data in a second different message also corresponding to the specified key ID;

an act of the first tier node detecting that its corresponding recurring aggregation period has occurred;

an act of the first tier node routing a message to the at least one other node, the message containing pre-aggregated event related data and key values corresponding to the one or more of the plurality of different key IDs; and the first tier node removing from the local dictionary each entry corresponding to the pre-aggregated event related data and key values corresponding to the one or more of the plurality of different key IDs contained in the routed message.

9. The method as recited in claim 8, wherein the overlay network is a ring overlay.

10. The method as recited in claim 9, wherein the an act of the first tier node pre-aggregating event related data from different messages corresponding to the same key ID comprises an act of the first node using a hash algorithm to convert the key ID into a key ID hash representative of an ID in the ID space of the ring overlay.

11. The method as recited in claim 10, wherein an act of the first tier node routing a message to the at least one other node comprises an act of sending the message to the ID in the ID space of the ring overlay.

12. The method as recited in claim 8, wherein the act of the first tier node pre-aggregating event related data from different messages corresponding to the same key ID for each corresponding different key ID within a local dictionary comprises an act of creating a dictionary entry for a key ID.

13. The method as recited in claim 8, wherein the act of the first tier node pre-aggregating event related data from different messages corresponding to the same key ID for each corresponding different key ID within a local dictionary comprises an act of merging received data for a key ID with existing data in the data dictionary for the key ID.

14. The method as recited in claim 8, wherein the act of the first tier node routing a message to the at least one other node comprises an act of the first tier node routing a message to one or more second tier nodes.

15. The method as recited in claim 8, wherein the act first tier node routing a message to one or more second tier nodes comprises an act of the first tier node routing a message to each second tier node for which the local dictionary contains data for at least one key ID that the second tier node has been partitioned to be responsible for in response to detecting the that the output timing interval has occurred, the message containing pre-aggregated data for the at least one key ID that the second tier node has been partitioned to be responsible for.

16. The method as recited in claim 8, wherein the act of the first tier node routing a message to the at least one other node comprises an act of the first tier node routing a message to a central node.

17. In a ring overlay network including a plurality of first tier nodes and a plurality of second tier nodes, and at least one other node, each first tier node having an recurring aggregation period, the recurring aggregation period indicating the frequency with which first tier nodes are to send pre-aggregated event related data to second tier nodes,
   each of the plurality of first tier nodes configured to:
   a) receive a plurality of event related messages, each event related message containing event related data and a key value corresponding to one of a plurality of different key IDs,
   b) pre-aggregate event related data within a local dictionary such that, for each different key ID, event related data from different messages corresponding to the same key ID are aggregated within the local dictionary with event related data of the different messages corresponding to the same key ID,
   c) determine when the output timing interval has occurred,
   d) send a message to each second tier node for which the local dictionary contains data for at least one key ID that the second tier node has been partitioned to be responsible for within the overlay network in response to detecting the that the recurring aggregation period has occurred, and
   e) remove from the local dictionary each entry corresponding to the pre-aggregated event related data corresponding to the at least one key ID contained in the routed message,
   each second tier node having a second recurring aggregation period, the second recurring aggregation period indicating the frequency with which second tier nodes are to send pre-aggregated event related data to the at least one other node, each of plurality of second tier nodes configured to:
   a) receive pre-aggregated event related data from a plurality of first tier nodes for each key ID that the second tier node has been has been partitioned to be responsible for,
   b) aggregate received pre-aggregated data for each key ID that the second tier node has been has been partitioned to be responsible for into an aggregate total for each key ID,
   c) determine when the second recurring aggregation period has occurred, and
   d) send the aggregate total for each key ID to the at least one other node,
a method for recovering from a node failure in the ring overlay network, the method comprising:
   an act of detecting that a node that is participating in aggregation of data within the ring overlay network has failed;
   an act of other nodes on the ring overlay network continuing to participate in aggregation in their configured capacity notwithstanding that the node has failed;
   an act of one or more of the other non-failing nodes in the same tier as the failing node each automatically assuming responsibility for aggregating at least a portion of the data that the failed node was responsible for prior to failure such that the one or more other non-failing nodes collectively assume responsibility for aggregating data in the capacity of the failed node;
   an act of making other nodes in the ring overlay network aware that the one or more other nodes have collective assumed responsibility for aggregating data in the capacity of the failed node; and
   an act of the other nodes reconfiguring themselves to interact with the one or more of other non-failing nodes to aggregate data in the ring overlay network.

18. The method as recited in claim 17, wherein an act of one or more of the other non-failing nodes in the same tier as the failing node each automatically assuming responsibility for aggregating at least a portion of the data that the failed node was responsible for prior to failure comprises an act of one or more other second tier nodes assuming responsibility for a range of the ring ID space that the failed node was responsible for.

19. The method as recited in claim 18, wherein the an act of making other nodes in the ring overlay network aware that the one or more other nodes have collective assumed responsibility for aggregating data in the capacity of the failed node comprises:
   an act of the one or more nodes updating routing tables to indicate the changes in responsibility; and
   an act of propagating updated routing table information to other nodes on the ring overlay.

20. The method as recited in claim 19, wherein the act of the other nodes reconfiguring themselves to interact with the one or more of other non-failing nodes to aggregate data in the ring overlay network comprises an act of the other nodes using the updated routing table information to update their routing tables.

* * * * *